(12) United States Patent
Suggi Liverani et al.

(10) Patent No.: US 8,464,632 B2
(45) Date of Patent: Jun. 18, 2013

(54) INTEGRATED CARTRIDGE FOR EXTRACTING A BEVERAGE FROM A PARTICULATE SUBSTANCE

(75) Inventors: Furio Suggi Liverani, Trieste (IT);
Luca Mastropasqua, Trieste (IT);
Frans Van Eeden, Milan (IT); Bruno Dellapietra, Dunno Aurisina (IT)

(73) Assignee: Illycaffe' S.p.A. (IT)

( * ) Notice: Subject to any disclaimer, the term of this patent is extended or adjusted under 35 U.S.C. 154(b) by 652 days.

(21) Appl. No.: 12/617,341

(22) Filed: Nov. 12, 2009

(65) Prior Publication Data
US 2010/0043646 A1  Feb. 25, 2010

Related U.S. Application Data

(62) Division of application No. 10/590,286, filed as application No. PCT/EP2005/003037 on Mar. 22, 2005, now Pat. No. 7,836,819.

(30) Foreign Application Priority Data

Mar. 26, 2004 (EP) .................................. 04007293
Mar. 26, 2004 (EP) .................................. 04007294
Mar. 26, 2004 (EP) .................................. 04007295
Mar. 26, 2004 (EP) .................................. 04007296

(51) Int. Cl.
*A47J 31/44* (2006.01)
*B65B 29/02* (2006.01)
*B65D 85/804* (2006.01)

(52) U.S. Cl.
USPC ................... 99/295; 99/299; 99/323; 426/77; 426/123

(58) Field of Classification Search
USPC ................ 99/295, 302 R, 299, 323; 426/123, 426/122, 77
See application file for complete search history.

(56) References Cited

U.S. PATENT DOCUMENTS

| 3,713,377 | A |   | 1/1973 | Arnett et al. |
| 4,389,925 | A |   | 6/1983 | Pianna |
| 4,921,712 | A |   | 5/1990 | Malmquist |
| 5,127,318 | A |   | 7/1992 | Selby, III |
| 5,243,164 | A |   | 9/1993 | Babinec et al. |
| 5,287,796 | A | * | 2/1994 | Timm ............................ 99/282 |

(Continued)

FOREIGN PATENT DOCUMENTS

| EP | 0931490 | 7/1999 |
| EP | 1344722 | 9/2003 |
| WO | 9317932 | 9/1993 |

*Primary Examiner* — Reginald L Alexander
(74) *Attorney, Agent, or Firm* — Cantor Colburn LLP

(57) ABSTRACT

A cartridge, particularly for espresso coffee machines, for extracting a beverage from a particulate substance contained therein by means of water under pressure is provided. The cartridge comprises a main body with a cup portion and a lid portion. The cup portion comprises a base, a sidewall and a rim opposed to the base, while the lid portion is fixedly attached to the rim of the cup portion so as to define an internal volume of the cartridge. The internal volume of the cartridge houses the particulate substance comprised within filtering means for retaining the particulate substance and for percolating fluid substances therethrough. The lid portion comprises a normally closed lid port defining a first passage for percolation fluid substances when it is opened. The cartridge further comprises a tappet arranged inside the internal volume so as to pierce the base when a pressure is applied to the base towards the internal volume, thus opening a normally closed cup port.

11 Claims, 20 Drawing Sheets

U.S. PATENT DOCUMENTS

| | | | |
|---|---|---|---|
| 5,753,297 A | 5/1998 | Schmed | |
| 6,044,754 A | 4/2000 | Fuentes | |
| 6,412,394 B2 | 7/2002 | Bonanno | |
| 6,550,371 B1 * | 4/2003 | Del Bon et al. | 99/295 |
| 6,711,988 B1 | 3/2004 | Eugster | |
| 6,740,345 B2 | 5/2004 | Cai | |
| 6,832,542 B2 | 12/2004 | Hu et al. | |
| 6,948,420 B2 | 9/2005 | Kirschner et al. | |
| 7,490,542 B2 | 2/2009 | Macchi et al. | |
| 7,604,826 B2 * | 10/2009 | Denisart et al. | 426/77 |
| 7,685,930 B2 * | 3/2010 | Mandralis et al. | 99/295 |
| 2003/0056661 A1 | 3/2003 | Hu et al. | |
| 2003/0096038 A1 | 5/2003 | Cai | |
| 2003/0172813 A1 | 9/2003 | Schifferle | |
| 2004/0115317 A1 * | 6/2004 | Doglioni | 426/123 |

\* cited by examiner

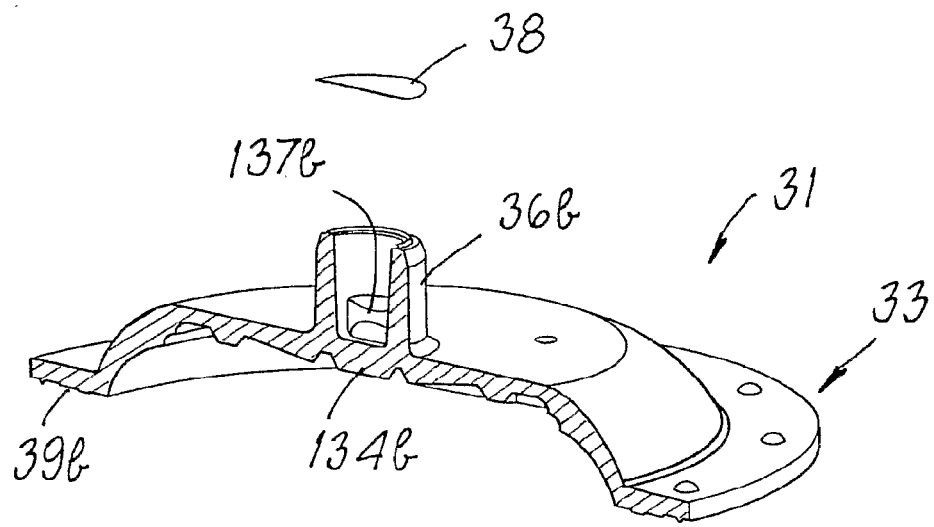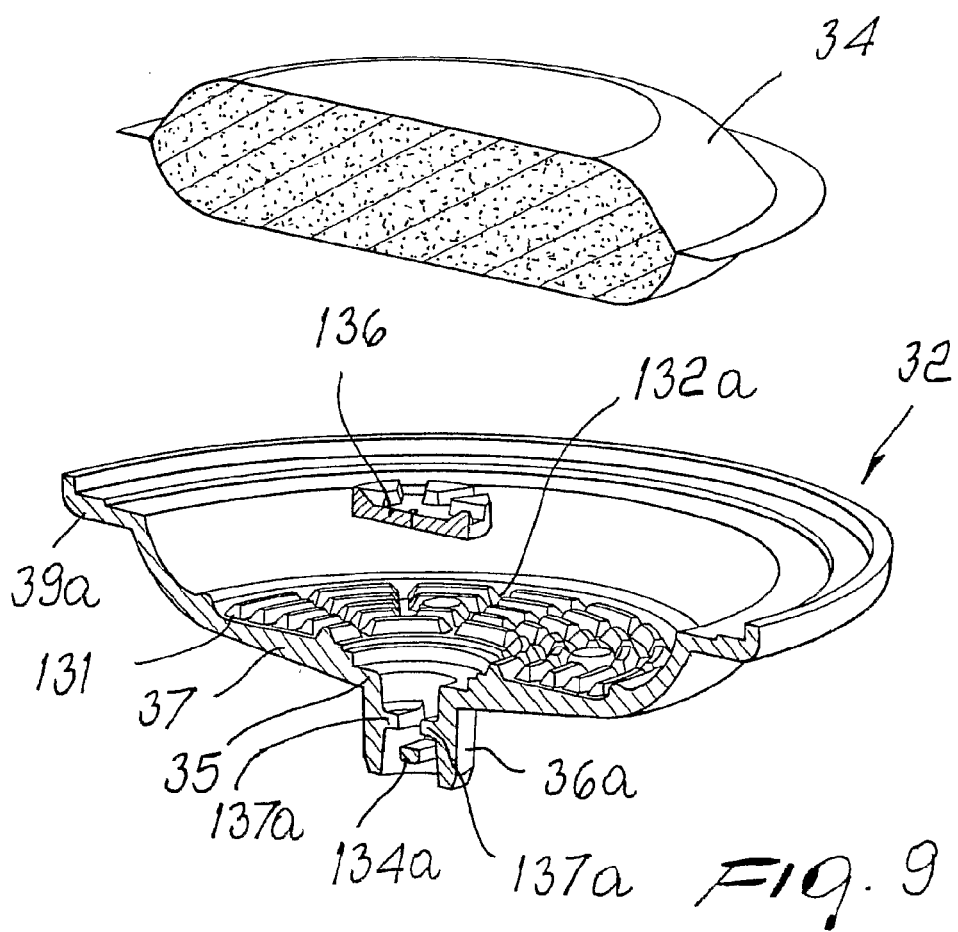
Fig. 9

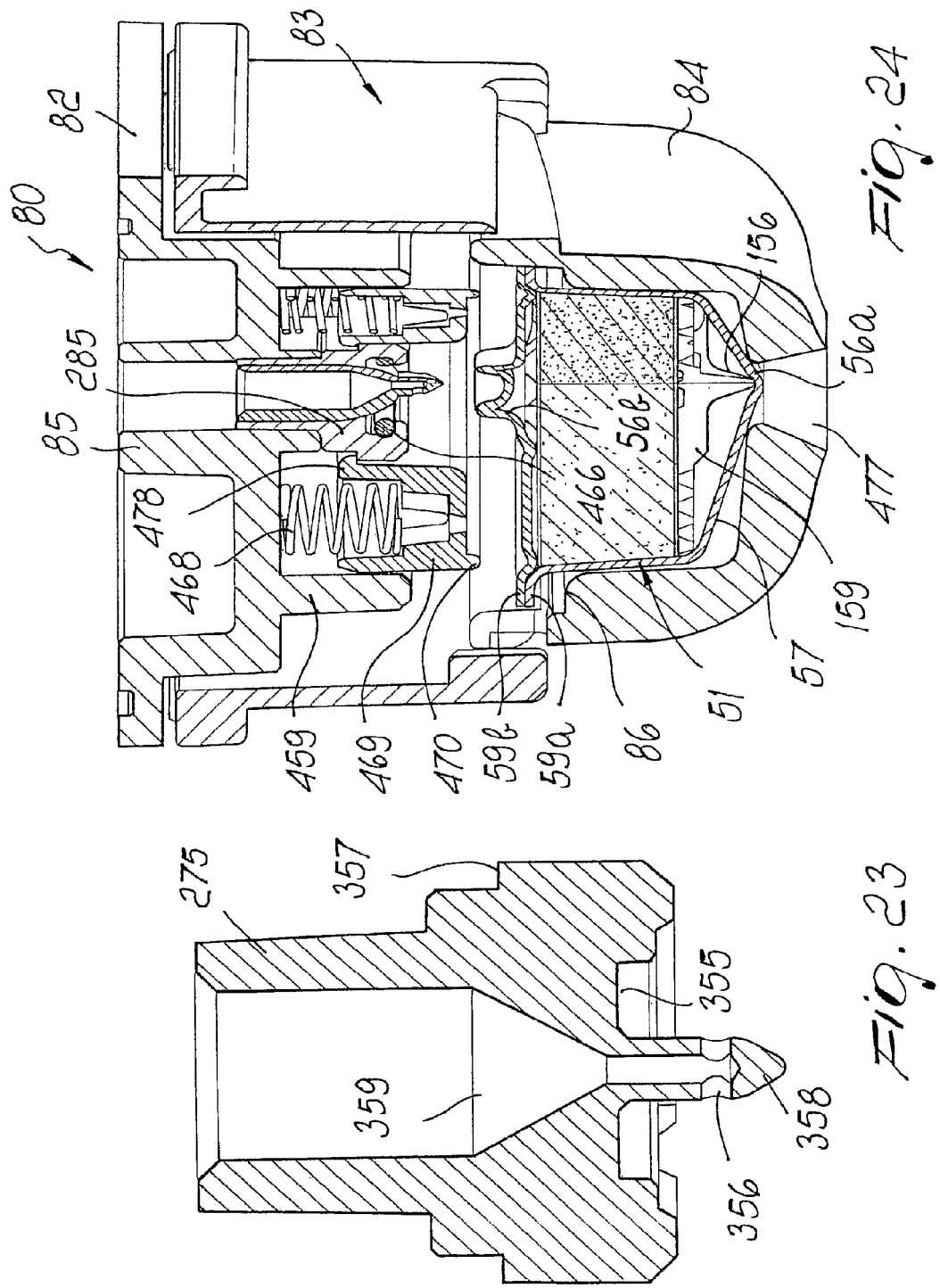

INTEGRATED CARTRIDGE FOR EXTRACTING A BEVERAGE FROM A PARTICULATE SUBSTANCE

CROSS REFERENCE TO RELATED APPLICATION

This application is a divisional application of, and claims the benefit of, U.S. patent application Ser. No. 10/590,286 filed on 22 Aug. 2006, the contents of which are herein incorporated by reference in their entirety.

TECHNICAL FIELD

The present invention relates to an integrated cartridge for extracting a beverage from a particulate substance, such as ground coffee, instant coffee, tea, powdered chocolate or milk, and the like.

BACKGROUND

It is known that machines for extracting a beverage from a particulate substance usually require that the particulate substance is placed into a filtering receptacle installed in the machine. In particular, automatic/semiautomatic espresso coffee machines comprise a filtering receptacle, also called filter holder, in which a dose of ground coffee is placed before the extraction of coffee beverage takes place.

The general steps for extracting a coffee beverage in an espresso coffee machine, which are substantially equivalent to those of other automatic machines for preparing a beverage starting from a powdered substance, comprise a phase of delivering hot water under suitable pressure into an extraction chamber which includes the filtering receptacle, a brewing phase and a phase of conveying the brewed beverage into an external cup or glass, ready to drink.

Ground coffee, as well as other particulate substances for preparing brewed beverages, is usually a single use substance, in that the organoleptic qualities such as taste, aroma and body of the brewed beverage are irremediably lost once ground coffee has been soaked. Accordingly, in espresso coffee machines and in other brewing machines the particulate substance has to be removed after one single brewing. This is the reason why the filtering receptacle housing a dose of ground coffee is usually manually removable from the espresso coffee machine, in order to allow emptying of the receptacle from the used ground coffee and filling it with a new dose of ground coffee.

In order to facilitate the operations of filling and emptying the filtering receptacle, single serving pre-packaged tablets of ground coffee have been provided, consisting of a dose of ground coffee contained in a filtering paper bag or sachet, to be placed directly in a filter holder of the espresso coffee machine. While this arrangement has resulted handy, it is affected by some drawbacks. In particular, the tablet is not air-tight and accordingly a second air-tight packaging must be provided for enclosing each dose, in order to keep the tablet uncontaminated from the external environment during storage.

Moreover, the user's hands come into contact with the tablet when the tablet is placed on the filter holder so that hygiene requirements are not fully assured.

In the past years, disposable capsules containing ground coffee have been also provided. Such capsules, generally having a frustum shape, are made of plastics or aluminum and provide a better air-tight barrier to the external environment than the filtering paper used in tablets.

A known capsule has a top surface that is pierceable by an injection needle/nozzle of the espresso coffee machine, in order to inject water under pressure inside the capsule, and a bottom surface comprising weakened zones which tear under pressure of percolation fluids. An internal filter is also provided inside the capsule for preventing solid substances from being ejected from the capsule together with the coffee beverage.

Another known capsule comprises a cylindrical body made of polypropylene, with a top and a bottom surface having a plurality of openings for distributing hot water throughout the dose of ground coffee, and comprising a sheet of paper filter for blocking passage of ground coffee outside the openings of the bottom surface during the extraction phase. These capsules have usually to be placed into a further packaging, such as a multilayered plastic sachet.

In order to prepare a coffee beverage, the known capsules and cartridges are placed into the filter holder, that constitutes an extraction chamber for coffee when it is installed on the coffee machine. During the extraction phase, the percolation fluids may come into contact with internal surfaces of the extraction chamber before definitively flowing out into the external coffee cup. Such contact contaminates the extraction chamber as well as the filter holder and after a number of coffee extraction operations the quality of the beverage is greatly reduced, suffering from residuals and contaminants in the extraction chamber.

Accordingly, the extraction assembly, comprising the extraction chamber and the filter holder, has to be accurately cleaned after a certain number of coffee extraction operations; in addition, decalcification must be performed on a regular basis.

Even when such cleaning operations are regularly carried out, the fluid turbulence inside the extraction chamber of the machine or the insufficient fluid-tight seal at the opened top surface of the capsule during water injection causes either the extracted beverage or the injected water to lap portions of the external surface of the capsule itself, thus jeopardizing the extraction hygiene requirements.

Another drawback of known capsules is that they do not retain percolation fluid residuals inside the capsule, in that perforations or openings on the top surface and/or on the bottom surface of the capsules provide for an escape for fluid residuals when the extraction is terminated and/or when the capsule is removed from the machine, causing the capsule to drip and dirt the surroundings of the coffee machine.

In addition, the known capsules and espresso coffee machines do not suffer from a limited hygienic character only, but they are often affected by a not so efficient distribution of hot water into the ground coffee and/or delivery of the coffee beverage.

In fact, in known capsules having a frustum shape, the hot water is injected into the internal volume by means of a nozzle that pierces the top surface, which has a smaller diameter than the bottom surface, so that hot water is sprayed from a single point rather than being evenly showered onto the whole dose of coffee. Accordingly, the hot water washes the coffee particles in an inhomogeneous way.

This drawback has been partially solved by the cartridge disclosed in EP-A-1344722, wherein two discs are provided inside the cartridge having a plurality of openings and a plurality of embossings, in order to create a plurality of fluid channels. Unfortunately, such known cartridge has to be pierced on both the upper and the lower surface in order to extract the beverage, and the internal volume of the cartridge has to be burdened with additional elements such as distribution discs.

Yet another drawback of prior art cartridges is that they are not very handy, in that a user must control the insertion direction when he installs the cartridge into an extraction machine. This control may be facilitated by means of a particular shape of the cartridge's receptacle in the machine, but when the user is particularly hurried (for instance, when the user is a barman assigned to continuously and quickly prepare coffee beverages for many customers) even a control of a minor nature is unacceptable.

BRIEF DESCRIPTION OF THE INVENTION

Aim of the present invention is to overcome the drawbacks of prior art cartridges and capsules by providing an integrated cartridge by means of which most of the tasks that are conventionally performed by beverage extraction machines are performed by the cartridge itself.

Within the scope of this aim, an object of the present invention is to provide a cartridge and an extraction assembly for producing a high quality beverage having improved organoleptic qualities, particularly when the beverage extraction machine is an espresso coffee machine.

A second particular object of the present invention is to provide a cartridge and an extraction system that greatly reduce or eliminate contamination of any component of machines for producing a beverage from a particulate substance.

A further object of the present invention is to provide a universal beverage extraction system, which takes advantage of its contamination-free structure for allowing consecutive extractions of beverages from different kinds of particulate substances.

Another particular object of the present invention is to guarantee a high level of preservation of the particulate substance inside the cartridge until the cartridge is installed into the beverage extraction machine, reducing contamination of the particulate deriving from the external environment.

Another object is to simplify use of the cartridge, reducing the number of operations to be carried out for preparing the cartridge to installation into a beverage extraction machine.

A further object is to provide an improved even distribution of the injection fluid throughout the entire dose of particulate substance of the cartridge.

Yet another object is to simplify and reduce the internal load of the cartridge and the beverage extraction machine without affecting the quality of the final beverage.

Not least object of the invention is to provide a cartridge and an extraction assembly which speed up the beverage preparation operations.

This aim, these objects and other which will become apparent hereinafter are achieved by a cartridge for extracting a beverage from a particulate substance contained therein by means of water under pressure, the cartridge comprising: a main body comprising a cup portion and a lid portion, the cup portion comprising a base, a sidewall and a rim opposed to the base, the lid portion being fixedly attached to the rim of the cup portion so as to define an internal volume of the cartridge, the internal volume of the cartridge housing the particulate substance comprised within filtering means for retaining the particulate substance and for percolating fluid substances therethrough, the lid portion comprising a lid port defining a first passage for percolation fluid substances, the base of the cup portion comprising a cup port defining a second passage for percolation fluid substances, characterized in that the base comprises a plurality of ridges directly formed thereon and protruding towards the internal volume of the cartridge, so as to support the filtering means and the particulate substance and to define a fine canalization between the filtering means and the cup port.

The aim and the objects of the invention are also reached by a cartridge for extracting a beverage from a particulate substance contained therein by means of water under pressure, the cartridge comprising: a main body comprising a cup portion and a lid portion, the cup portion comprising a base, a sidewall and a rim opposed to the base, the lid portion being fixedly attached to the rim of the cup portion so as to define an internal volume of the cartridge, the internal volume of the cartridge housing the particulate substance comprised within filtering means for retaining the particulate substance and for percolating fluid substances therethrough, the lid portion comprising a lid port defining a first passage for percolation fluid substances, the base of the cup portion comprising a cup port defining a second passage for percolation fluid substances, characterized in that it comprises a disc of porous material arranged between the filtering means and the base of the cup portion, so as to support the filtering means and the particulate substance and to define a fine canalization between the filtering means and the cup port.

The same aim and objects are also reached by a cartridge, particularly for espresso coffee machines, for extracting a beverage from a particulate substance contained therein by means of water under pressure, the cartridge comprising a main body comprising a cup portion and a lid portion, the cup portion comprising a base, a sidewall and a rim opposed to the base, the lid portion being fixedly attached to the rim of the cup portion so as to define an internal volume of the cartridge, the internal volume of the cartridge housing the particulate substance comprised within filtering means for retaining the particulate substance and for percolating fluid substances therethrough, the lid portion comprising a lid port defining a first passage for percolation fluid substances, the base of the cup portion comprising a cup port defining a second passage for percolation fluid substances, characterized in that the internal volume comprises valve means mounted on the cup port which are resiliently openable under pressure of the percolation fluid substances during a beverage extraction phase, so as to allow passage of the percolation fluid substances through the cup port during the beverage extraction phase.

Again, the objects of the invention are also achieved by a cartridge comprising a main body comprising a cup portion and a lid portion, the cup portion comprising a base, a sidewall and a rim opposed to the base, the lid portion being fixedly attached to the rim of the cup portion so as to define an internal volume of the cartridge, the internal volume of the cartridge housing the particulate substance comprised within filtering means for retaining the particulate substance and for percolating fluid substances therethrough, the lid portion comprising a normally closed lid port defining a first passage for percolation fluid substances when it is opened, characterized in that it comprises a tappet arranged inside the internal volume so as to pierce the base when a pressure is applied to the base towards the internal volume, thus opening a normally closed cup port.

BRIEF DESCRIPTION OF THE DRAWINGS

Further characteristics and advantages of the invention will become better apparent from the following description of preferred but not exclusive embodiments, illustrated by way of non-limitative embodiments in the accompanying drawings, wherein:

FIG. 9 is a perspective cross-sectional exploded view of the cartridge of FIG. 8;

FIG. 23 is a cross-sectional lateral view of the nozzle used in the extraction assembly of FIG. 19;

FIG. 24 is a broken away view of an extraction assembly according to a further embodiment of the invention, in which the capsule of FIG. 12 is installed;

DETAILED DESCRIPTION OF PREFERRED EMBODIMENTS

Figure 1:
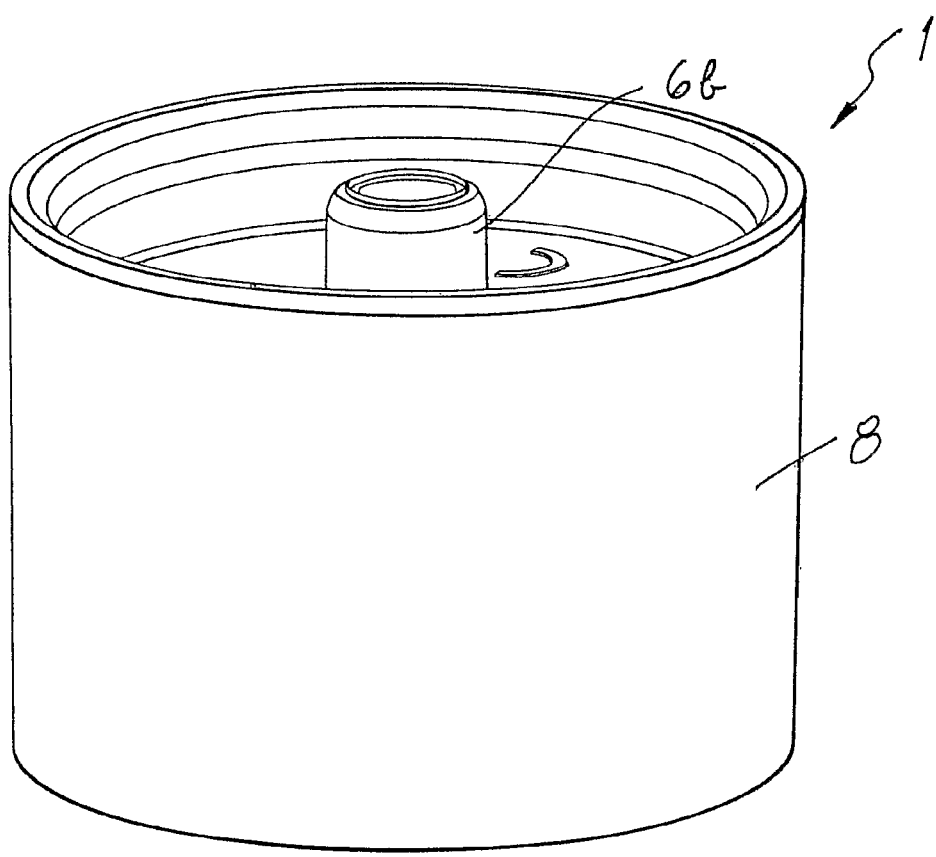
FIG. 1 is a perspective view of a cartridge according to a first embodiment of the invention.
Figure 2:
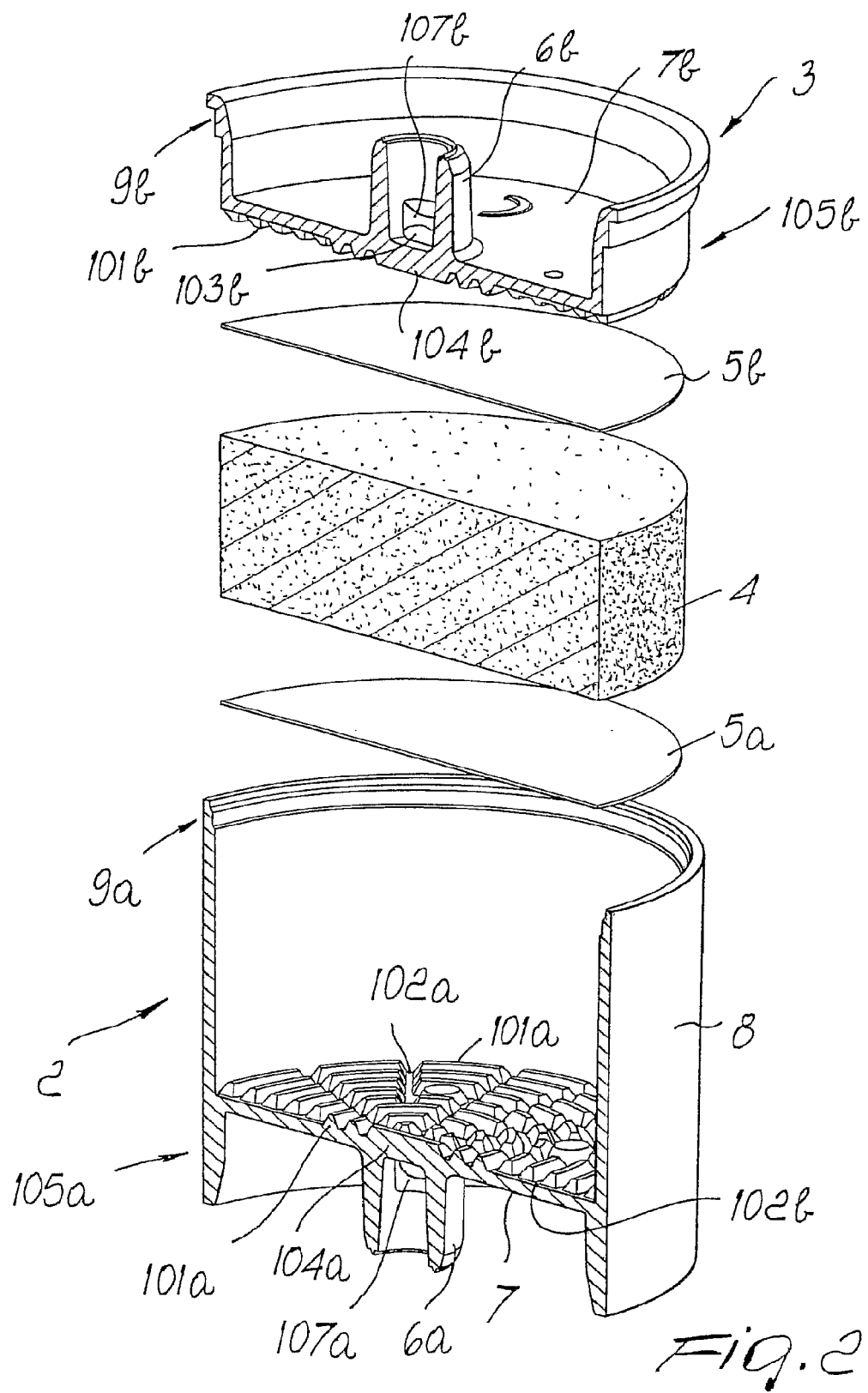
FIG. 2 is a perspective, cross-sectional, exploded view of the cartridge of FIG. 1, taken along plane A-A of FIG. 1.

With reference to FIGS. 1 and 2, a cartridge 1 is shown according to a first preferred embodiment of the present invention. The cartridge has a generally cylindrical shape and comprises a cup portion 2 and a lid portion 3 fixed thereon.

In particular, the cup portion 2 comprises a substantially circular base 7, a cylindrical sidewall 8 extending from base 7 and a rim 9a, which is disposed substantially opposite to the base 7 and defines an open end of the cup portion 2.

An internal volume is defined by the cup base 7, the sidewall 8 and the lid portion 3, when the lid portion is fixed on the cup portion. A dose of ground coffee 4 is housed in such internal volume and it is sandwiched between filtering means, preferably consisting of a first paper or tissue filter 5b and a second paper or tissue filter 5a. In an alternative embodiment, a tablet of a known kind can be provided, as it will be described hereafter.

Figure 4:
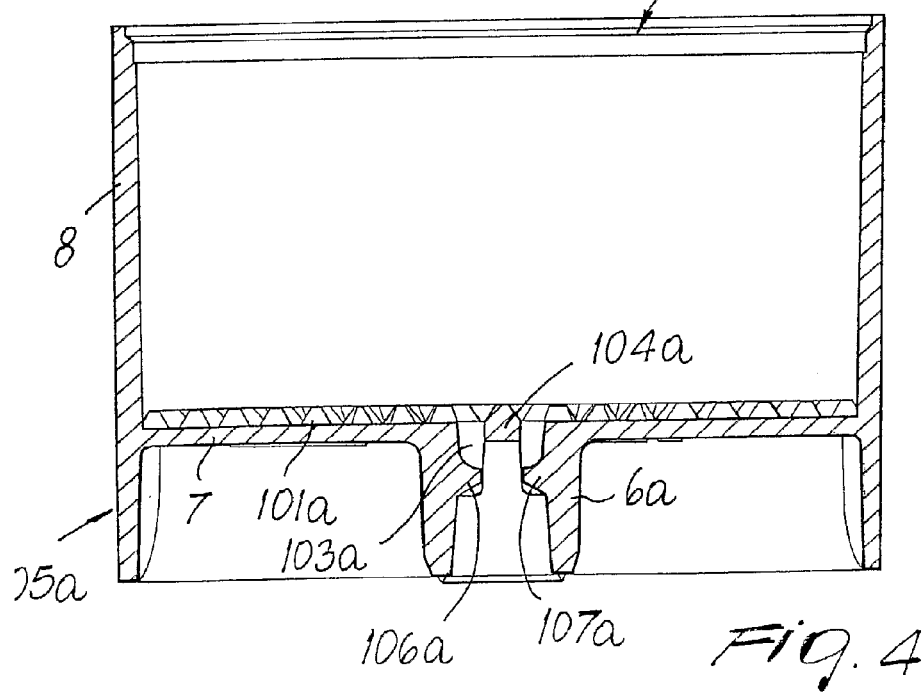
FIG. 4 is a cross-sectional view of the cup portion of FIG. 3, taken along plane B-B.

The cup portion 2 comprises a cup port 6a, which is preferably located in a central region of the cup base 7 and protrudes outwardly with respect to the internal volume of the cartridge, forming a spout. As shown in FIG. 2, the cup port 6a has a substantially cylindrical shape and provides for open access to the internal volume of the cartridge, thus allowing passage of fluids to or from the internal volume of the cartridge. To this aim, the opening 103a is provided on the cup base 7 in correspondence of the cup port 6a, as it is shown in FIG. 4.

The cup base 7 optionally comprises a flange 105a, axially aligned with sidewall 8 and protruding outwardly with respect to the internal volume of the cartridge. Such flange is preferably provided in order to end up with a protruding shape facilitating and promoting handling and automated production processes. Furthermore the capsule can be placed in a horizontal position on a table surface without tilting or rolling, it can be packaged and stacked more easily and it can also be "strip" packaged, i.e. fixed and sealed between two strips of polylaminate films.

Figure 3:
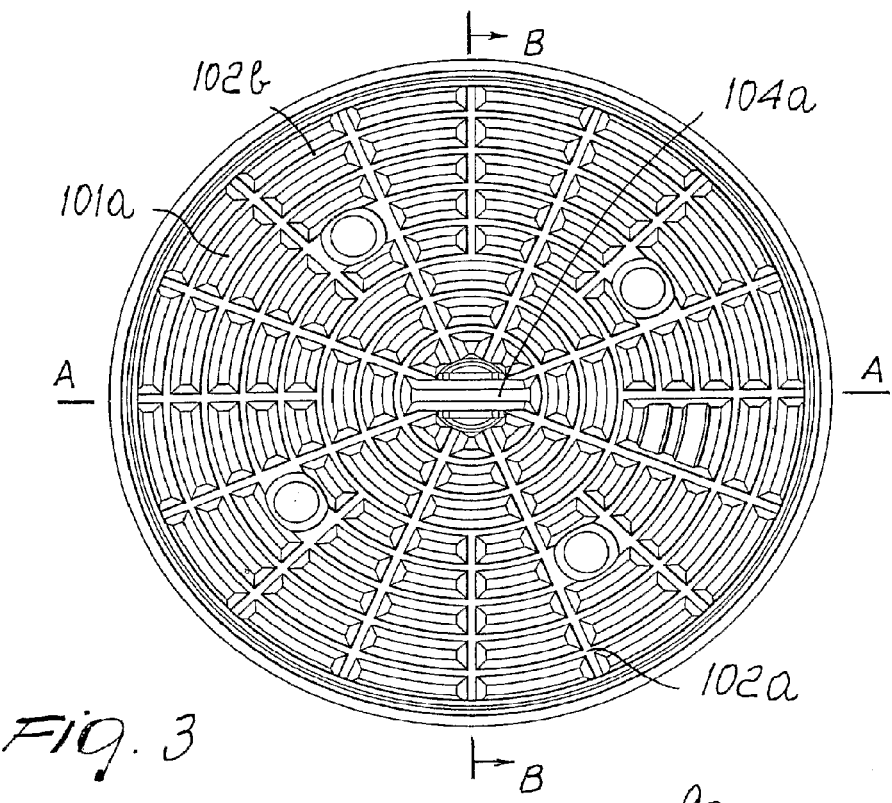
FIG. 3 is a top view of the cup portion of the cartridge of FIG. 1.

The lid portion 3 is shaped so as to fit with the open end of the cup portion 2 and comprises a lid base 7b, from which a substantially cylindrical sidewall 105b extends upwardly and slightly outwardly and which is substantially perpendicular to the lid base 7b. The sidewall 105b ends with an annular edge 9b that is located substantially opposite to the lid base 7b and that protrudes outwardly from the sidewall 105b, in order to fit with and lean on the rim 9a of the cup portion 2. Preferably, the annular edge 9b has a substantially stepped cross section, so as to engage with a complementary support located at the rim 9a of the cup portion 2, as depicted in FIG. 3. Other cross-sectional shapes of the annular edge 9b and of the rim 9a can be alternatively provided, as long as these shapes allow to fix the lid portion on the cup portion.

In preferred embodiments, the lid portion and the cup portion are welded to each other using an ultrasonic shear-welding technique. Alternatively, other known welding techniques can be used, for instance common ultrasonic welding, hot welding, bonding and so on. The cartridge according to the invention may also be manufactured as a single moulded piece.

The protruding sidewall 105b is preferably provided in order to facilitate and promote handling and automated production processes, as well as to dissociate the shear welding region away from the coffee tablet, thus minimizing interferences of migrating coffee particles with the plastic weld, which might compromise its tight sealing characteristics.

In the preferred embodiment depicted in FIGS. 1 and 2, the lid portion 3 comprises a lid port 6b in a central region of its base 7b, having a generally cylindrical shape and protruding from base 7b outwardly with respect to the internal volume of the cartridge. The lid port 6b provides for open access to the internal volume of the cartridge, thus allowing passage of fluids to or from the internal volume. To this aim, the opening 103b is provided on the lid base 7b in correspondence of the lid port 6b, as shown in FIG. 2.

It is seen that flanges 105a and 105b, together with the corresponding cup port and lid port, are such that the top and the bottom regions of the cartridge substantially have an overall E-shaped cross-section.

In alternative embodiments, described hereafter, the lid port does not protrude from the lid base 7b or is normally closed, being pierceable by an injection needle or nozzle during the extraction phase. Alternative embodiments of a similar kind will be presented hereafter.

In the cartridges according to the invention, either the lid port 6b or the cup port 6a may comprise hurdles for deviating a fluid flow. In particular, referring back to the embodiment of FIGS. 2-4, a first barrier 104a is provided on the internal side of the cup base 7 so that it radially crosses the central opening 103a from which the spout 6a protrudes, and second barriers 106a, 107a are provided on the internal surface of the cup port 6a at a distance from the first barrier and from the opening 103a.

Preferably, second barriers 106a and 107a face each other and protrude from the internal surface of the cup port 6a so as to define a sort of zigzag path for the fluid passing through the cup port 6a, thus breaking any direct fluid flow to or from the internal volume of the cartridge and avoiding exceedingly accelerated fluid flow, which may cause jet-spray effects such as spattering.

The first barrier 104a is particularly useful for either deviating the fluid flow or providing a support against filter paper deformation that may result from the hydraulic extraction fluid pressure. Accordingly, obstruction of the openings 103a and possible breaking of the filter paper are prevented.

Additionally or alternatively, corresponding fluid flow barriers 104b and 107b are also provided at lid port 6b, as seen in FIG. 2. In particular, the barrier 104b spans the lid opening 103b, while the barrier 107b protrudes from the internal surface of the lid port 6b, facing an identical barrier in order to define a fluid flow pathway substantially analogous to that formed inside the cup port 6a.

Notwithstanding preferred embodiments of the cartridge according to the invention comprise fluid flow hurdles as depicted in FIGS. 2-4, the skilled in the art easily appreciates that alternative arrangements or shapes of fluid flow hurdles can be used for the same purpose. For instance, a cross-shaped fluid flow barrier may be provided, so as to support the paper filter and break direct fluid flow into four separate flows. Alternatively, radial projections formed around the lid or the cup opening and radially protruding towards the center of such opening may be provided, as it will be described hereinafter with reference to FIG. 27.

Fluid flow hurdles may not be directly formed on the internal surface of the cartridge, but they may be a separate means which can be inserted and fixedly attached to an inlet or an outlet port of the cartridge. For instance, a small plastic tube with both open ends closed by a fluid permeable filter material (for instance, films of thermoplastic sieve material or open mazed tissue or paper). An example of a separate fluid flow hurdle will be described hereinafter with reference to FIG. 27.

Moreover, the fluid flow hurdles may be provided at both the lid and cup ports, at only one of such ports, or may not be provided at all, according to fluid flow requirements.

The cup portion 6a further comprises a plurality of ridges 101a directly formed on the base 7 and protruding towards the internal volume of the cartridge, in particular towards the external surface of the paper filter 5a. As it is seen from FIG. 3, the ridges 101a are arc-shaped and elongated. They directly contact paper filter 5a so as to form a plurality of small channels 102a-102b, which are directed along a plurality of concentric and radial directions (as shown in FIG. 3) and put in a fluid communication the whole bottom surface of the filter-coffee assembly 4, 5a with the cup port 6a. Such channels, preferably, have an average width/height of about 1 mm.

Similarly, ridges 101b are provided on the lid portion 3 which protrude towards the internal volume of the cartridge, in particular towards the upper surface of the paper filter 5b. A plurality of small channels is accordingly provided between the filter 5b and the lid base 7b, connecting the lid port 6b to the whole top surface of the filter-coffee assembly 4, 5b.

In alternative embodiments, small fluid channels may be provided on cup portion only, or on lid portion only, or they may not be provided at all. In such cases, a reduced number of ridges is preferably formed on either the cup base or the lid base, and they protrude towards the internal volume of the cartridge in order to form an air space between the cup/lid base and the filtering means. An exemplary arrangement of such kind will be explained hereafter with reference to FIG. 11.

Alternatively, in order to provide a fine canalization on at least a portion of the internal surface of the cartridge facing one of the top surface or the bottom surface of the dose comprising the ground coffee and the filtering means, a disc of porous material may be arranged between such dose and the cup port or the lid port. Preferably, such disc extends throughout the top or the bottom surface of the dose.

Even though not explicitly shown in FIGS. 1-4, the lid port and/or the cup port are preferably plugged by a film, for instance made of multilayered plastics, which can be manually removed or can be pierced or torn by the machine during the extraction phase.

Alternatively, the lid port or the cup port may be plugged by an integrated surface created during the manufacturing of the lid portion or by a rubber plug or seal, to be described thereafter, or the entire cartridge may be kept in a sachet or packaging to be manually opened before use. The sachet or packaging may be made of a polylaminate vacuumed or filled with an inert gas under pressure (such as in Modified Atmosphere Packaging or MAP techniques).

Either the lid port or the cup port may be alternatively sealed by means of edible solid substances (e.g. polysaccharides, proteins and lipids) that are air-impermeable and water-soluble or that melt at the temperature of the inlet water.

The cartridge 1 is preferably made of polypropylene and it is manufactured using known injection moulding techniques. Anyway, this cartridge as well as any cartridge according to the invention may be made of any material such as: other thermoplastic materials, for instance PET; elastomeric-thermoplastic materials or TPEs, for instance, SANTOPRENE, i.e. a mixture of non interlaced EPDM and polypropylene; thermosetting compositions, for instance, a polyester; rubbers or elastomers, for instance, silicone or MVQ; polylaminate thermoplastic materials, for instance a composite sheet made of PE, PET and PVDC; aluminium; other polylaminate materials, for instance, a composite sheet made of PE, PET and aluminium. The cartridge 1 may also be manufactured using other techniques, such as thermoforming.

The main body of an exemplary cartridge such as the one depicted in FIG. 1 is, for instance, 30-35 mm high and 35-40 mm wide, and the lid port and the cup port are about 7-8 mm high and 8-10 mm wide. However, the skilled in the art readily understands that the size of the cartridges according to the invention may be different, according to the extraction requirements and the structure of the beverage extraction machine.

Having now defined the main characteristics of cartridge 1, it can be appreciated that this cartridge eliminates the traditional contamination of the extraction chamber of a coffee machine, in that the cup port/spout 6a acts as an outlet for directing the extracted beverage directly into an external cup that is then used for drinking. The spout 6a is accordingly shaped so as to fit in known filter holders or so as to outwardly protrude with respect to purpose-built filter holders, thus keeping perfectly clean the internal surfaces of the filter holder and prevent the extracted beverage exiting the cartridge from contacting such surfaces.

Additionally, the small channels directly formed on the internal surface of the cup portion allow to eliminate additional fluid director members from the inside of the cartridge and advantageously combine with the cup port so as to define an integrated conveyor for the extracted beverage. At the same time, the small channels allow to keep the internal pressure level drop of the cartridge at a substantially lower value between upper zone and lower zone of the coffee cake, so that the full volume of ground coffee is exploited and the resulting beverage has enhanced organoleptic qualities.

For functional reasons, it is preferable to keep the space between the coffee cake and base of the cup portion or the lid portion as little as possible.

Another improvement involved by the particular cartridge of FIG. 1 is that it is reversible, i.e. it can be inserted also upside-down. In fact, the main body of the cartridge is shaped so as to be substantially symmetrical with respect to an virtual plane perpendicular to the water injection axis. In particular, the cup port 6a ant the lid port 6b are substantially identical in shape and size, they are aligned on a same water injection axis and the height of flange 105a is substantially equal to the height of the cylindrical sidewall 105b, as illustrated in FIG. 2. Advantageously, a fine canalization is provided on both the internal surfaces of the cup portion and of the lid portion.

Accordingly, the cartridge 1 can be installed in a filtering receptacle regardless of which port will act as the inlet port and which port will act as the outlet port, thus greatly facilitating the operation of inserting the cartridge into an extraction machine.

While characteristics have been shown with reference to the exemplary embodiment of FIGS. 1-4, several alternative embodiments of the invention can be provided by either suitably combining the fundamental characteristics already illustrated or by adding other features still falling within the scope of the invention.

Figure 5:
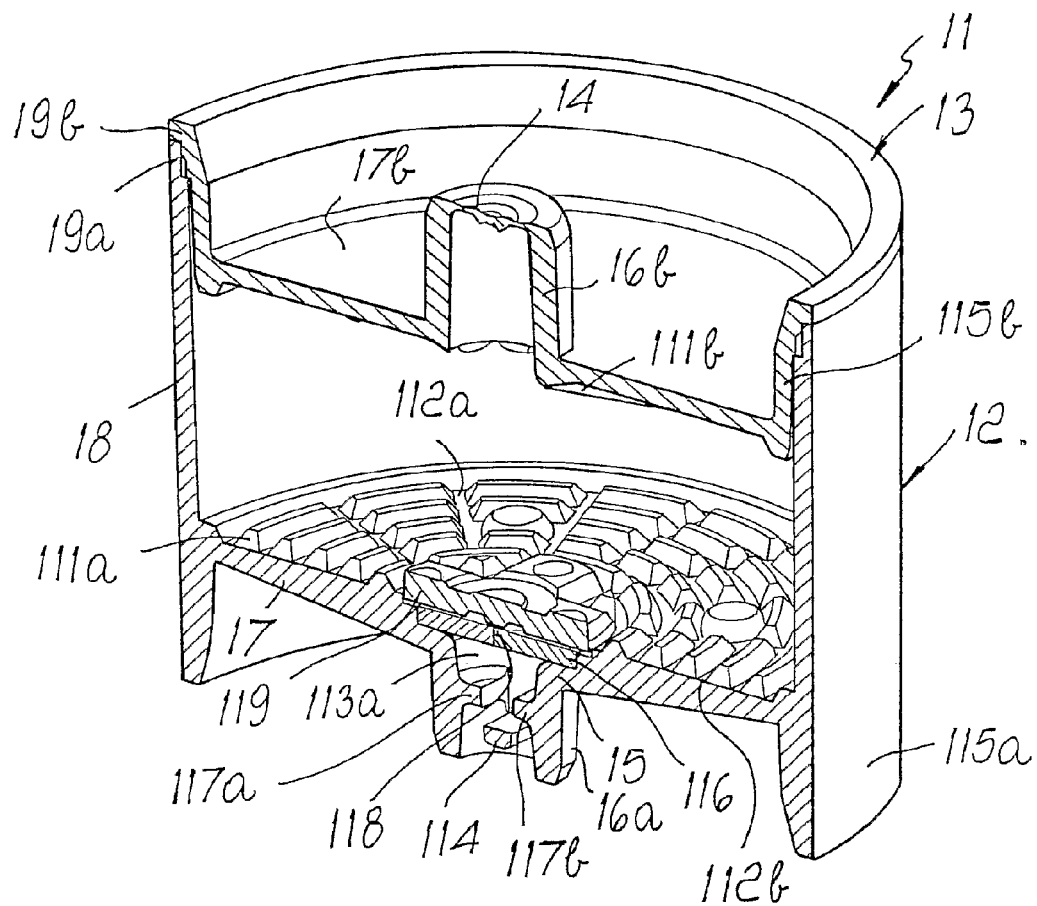
FIG. 5 is a perspective cross-sectional view of a cartridge according to a second embodiment of the invention.

With reference to FIG. 5, a second preferred embodiment of the invention is illustrated. In particular, FIG. 5 is a cross-sectional view of a cartridge 11 which, even though the main body is externally similar to that depicted in FIG. 1, features internal variants.

While only a sectional view of cartridge 11 is shown in FIG. 5, it is understood that this view is taken along a virtual radial plane halving the whole actual cartridge, which is not shown in the Figures for clarity reasons. It is clear that the skilled in the art has no difficulty in picturing the structure of the whole cartridge 11 starting from the sectional view of FIG. 5.

The cartridge 11 has a generally cylindrical shape and comprises a cup portion 12 and a lid portion 13. The cup portion 12 comprises a base 17, a sidewall 18 and a rim 19a that is disposed substantially opposite to the base 17 and defines an open end of the cup portion 12.

An internal volume is defined by the cup base 17, the sidewall 18 and the lid portion 13, when the lid portion is mounted on the open end of the cup portion 12. A dose of ground coffee is housed in such internal volume, enclosed by filtering means either in a way similar to that depicted in FIG. 2 or as in a tablet or cake of a known kind, as it will be better described hereafter.

In FIG. 5, both the ground coffee and the filtering means have been omitted for simplicity, but it is intended that they substantially fill the internal volume of the cartridge, as it occurs in the embodiment of FIG. 2.

The cup portion 12 comprises a cup port 16a, preferably located in a central region of the cup base 17 and protruding outwardly with respect to the internal volume of the cartridge. The cup port 16a has a substantially cylindrical shape and provides for open access to the internal volume of the cartridge, thus allowing passage of fluids to or from the internal volume of the cartridge. To this aim, an opening 113a is provided on the cup base 17 in correspondence of the cup port 16a.

The cup base 17 preferably comprises a flange 115a, aligned with the sidewall 18 and protruding outwardly with respect to the internal volume of the cartridge.

The lid portion 13 is shaped so as to fit with the open end of the cup portion 12 and comprises a lid base 17b, from which a substantially cylindrical sidewall 115b extends upwardly and slightly outwardly. The sidewall 115b ends with an annular edge 19b that is located substantially opposite to lid base 17b and that protrudes outwardly from the sidewall 115b, in order to fit with and lean on rim 19a of the cup portion 12.

Preferably, the annular edge 19b has a substantially stepped cross section, so as to engage with a complementary support located at the rim 19a of the cup portion 12, as depicted in FIG. 5. Alternatively, other cross-sectional shapes of the annular edge 19b and of the rim 19a can be provided, as long as such shapes allow to fix the lid portion on the cup portion.

The lid portion 13 further comprises a normally closed lid port 16b, preferably located in a central region of the base 17b and protruding outwardly with respect to the internal volume of the cartridge 11. The wording "normally closed" as intended herein indicates a port which is air-tight sealed before extraction and it is opened either manually by a user or automatically by the beverage extraction machine, for example by piercing the surface that plugs the port.

In the embodiment of FIG. 5, the lid port 16b is plugged by a weakened small surface 14 that is integrated with the lid port 16b. Alternatively, the lid port may be plugged by a plastic film welded on the external mouth of the lid port or by a rubber or rubber-like plug or seal, described hereafter.

The internal surface of the lid port 16b is substantially smooth, but fluid flow hurdles can be alternatively provided as those described with reference to the embodiment of FIG. 2.

The cup portion 12 comprises a cup port 16a, located on the cup base 17 and preferably having a substantially cylindrical shape. In the preferred embodiment depicted in FIG. 5, the cup port 16a is located in the central region of the base 17, protrudes outwardly with respect to the internal volume of the cartridge 11 and comprises hurdles 114, 117a and 117b for breaking direct fluid flow passing through the cup port.

The first hurdle 114 is formed inside the cup port 16a in the proximity of its output mouth so as to radially cross the internal volume of the cup port, while the second hurdles 117a and 117b flange out the internal surface of the cup port and face each other.

Similarly to the embodiment depicted in FIG. 2, the cup portion 12 comprises a plurality of ridges 111a that are directly formed on the internal side of the base 17 and protrude towards the internal volume of the cartridge. The ridges 111*a* define a plurality of small channels 112*a*, 112*b* between the cup base 17 and the filtering means, for conveying the extracted beverage to the cup port 16*a*.

In the particular embodiment shown in FIG. 5, unlike lid portion 3, a fine canalisation is not provided between the lid portion and the assembly consisting of the ground coffee and the filtering means. Instead, sparse ridges 111*b* are provided on the bottom side of the lid portion 13, serving the purpose of creating a very small gap between the lid portion and the ground coffee. However, it is clear that as an alternative to this arrangement a canalisation may still be provided, as described above with reference to the lid portion 3.

Advantageously, the cartridge 11 comprises valve means, for regulating the fluid flow passage through the cup port 16*a*. The valve means are particularly conceived for application to the cup port, but they can be applied to both the cup port and the lid port of a cartridge according to the invention, or to the lid port only, according to the functional requirements of the cartridge.

In the embodiment shown in FIG. 5, the valve means lean on an annular recess 15, that is formed around the opening 113*a* and cover opening 113*a*. To this aim, the thickness of the base 17 preferably tapers from the cup port 16*a* towards the periphery, to allow the formation of the recess 15.

The valve means preferably comprises a rubber (e.g. silicone rubber), rubber-like, elastomeric or plastic pad or disc having a narrow through slit or orifice formed therein connecting a top surface to a bottom surface of the pad. If no axial pressure is applied to the pad, the slit provides for an air-tight seal, whereas if an axial pressure is applied, such as the pressure of percolation fluids extracted from the ground coffee, a portion of the pad warps and the slit slightly widens, thus allowing passage of the percolation fluids, i.e. of the beverage.

According to the particular embodiment depicted in FIG. 5, the valve means comprise a rubber pad or disc 116, leaning on the recess 15 so as to air-tightly close the aperture 113*a* of the cup port and acting as a septum. While the pad 116 is described as simply leaning on the recess 15, it may optionally be bonded to such recess or otherwise fixed using known techniques.

The pad 116 comprises a top circular surface and a bottom circular surface and a slit 118 that axially traverses the pad from the centre of the top surface to the centre of the bottom surface.

The slit 118 is a pre-pierced one and it is preferably made using a thin needle. The slit may alternatively be a radial linear or cross-shaped cut or incision, or a plurality of slits may be provided through the pad, as long as these slits, cuts or incisions do not substantially allow passage of air inside the cartridge when the cartridge is not under fluid pressure and allow passage of percolation fluids during the beverage extraction phase.

In order to provide a support for the filtering means enclosing the ground coffee and to convey the extracted beverage to the pad 116, a shim 119 is advantageously mounted on the cup base 17 and upstream of the pad 116.

Figure 7:
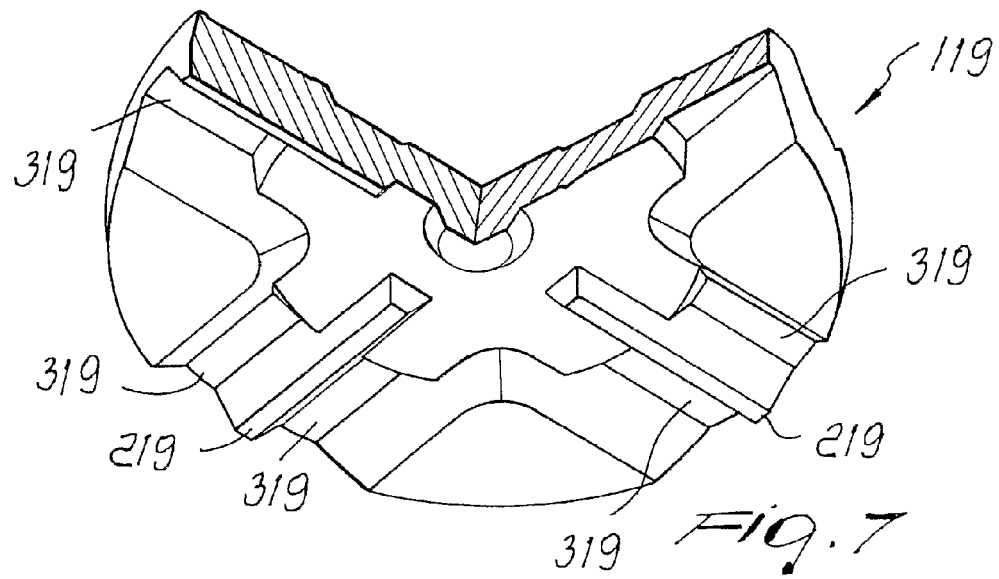
FIG. 7 is a perspective broken away view of the shim of FIG. 5.

With particular reference to the broken away view of FIG. 7, the shim 119 comprises a bottom surface that faces the pad 116 and that is shaped so as to define fluid flow channels 319 between the shim and the pad: to this aim, the bottom surface of the shim 119 comprises radially oriented ridges 219.

The top surface of the shim 119 comprises ribs for supporting the coffee-filtering means assembly, which are preferably sized so that the thickness of the shim 119 is substantially equal to the height of the ridges 111*a* of the cup portion 12.

In alternative embodiments, not shown in the Figures, the shim may comprise through holes for conveying the percolation fluids to the rubber pad, or it may be substituted by any other supporting means that separate the dose of ground coffee from the rubber pad, such as those depicted in FIG. 27 to be described hereinafter.

Yet in another embodiment, the valve means do not comprise a separate shim at all. For instance, a third embodiment of the invention comprising such alternative valve means comprises only a pad or disc, made of rubber, rubber-like, elastomeric, or whichever resilient material.

Figure 6:
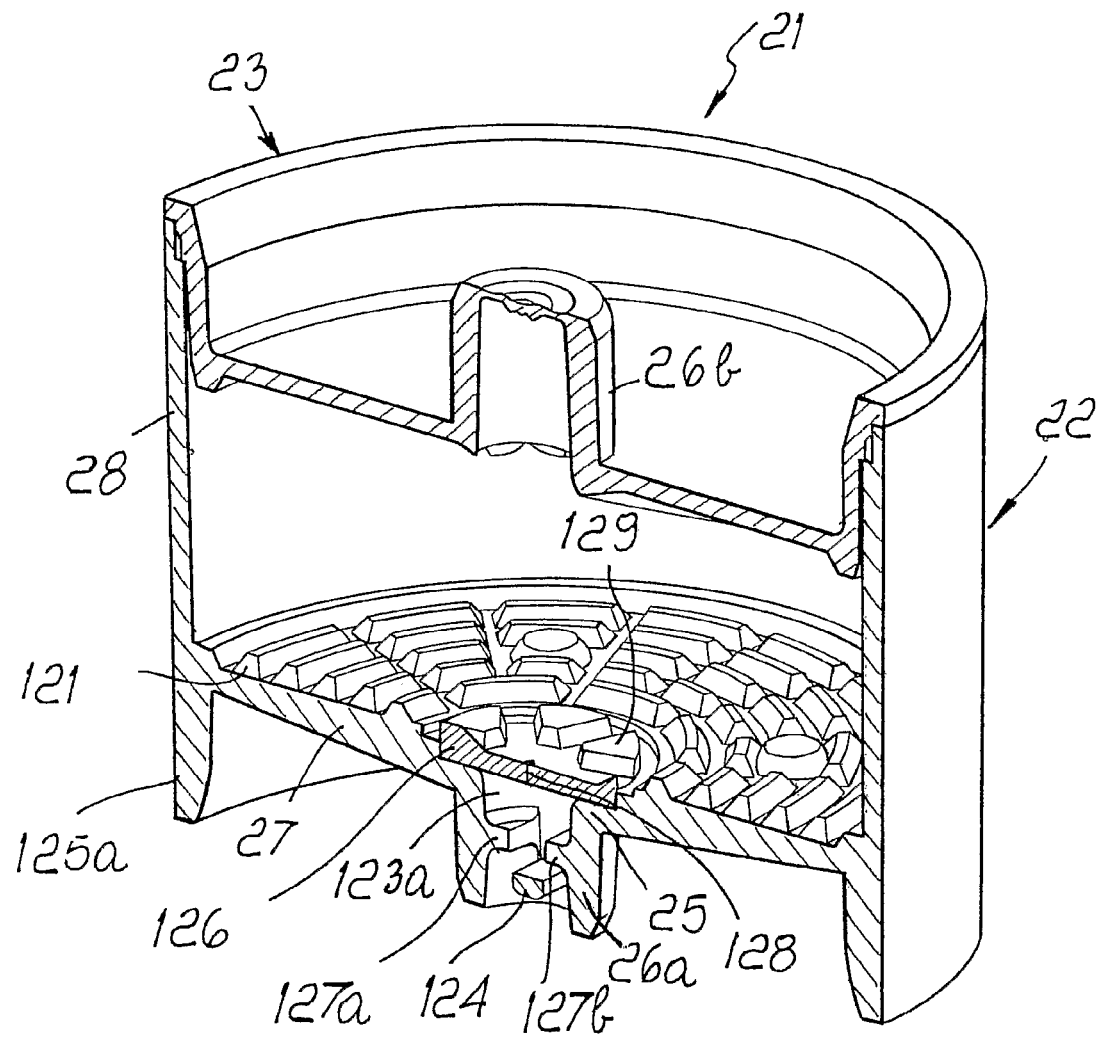
FIG. 6 is a perspective cross-sectional view of a cartridge according to a third embodiment of the invention.

In particular, with reference to FIG. 6, a cartridge 21 according to a third preferred embodiment of the invention comprises a cylindrically shaped cup portion 22, comprising a base 27, a sidewall 28 and an open end on which a lid portion 23 is engaged so as to define an internal volume of the cartridge. Inside the cartridge, a dose of ground coffee and the corresponding filtering means are provided as in the previously described cartridges, but they are not shown in FIG. 6, for simplicity.

The lid portion 23 comprises a normally closed lid port 26*b* and it has substantially the same features of the already described lid portion 13.

The cup portion 22 comprises a cup port 26*a*, inside which fluid flow hurdles 124, 127*a* and 127*b* are provided. Moreover, the top surface of the base 27 comprises a plurality of ridges 121, which are arc-shaped and distributed throughout the surface of the base 27 substantially as ridges 111*a*, so as to define concentric and radial small channels which converge to an annular recess 25. A circular rubber pad 126 leans on the recess 25 so as to air-tightly plug the aperture 123*a* of the cup port 26*a*. Notwithstanding pad 126 is herein described as simply leaning on recess 25, it may optionally be bonded to an edge of such recess or be otherwise fixed through known means.

Similarly to pad 116, pad 126 comprises a through slit 128 at its centre, which slit is normally closed and slightly widens, thus allowing passage of the percolation fluids, during the beverage extraction phase.

In order to support the dose of ground coffee and the filtering means, the pad 126 preferably comprises ribs 129, which are directly formed on its top surface and shaped so as to allow the passage of fluids directly deriving from the coffee/filter assembly and from the channels defined by ridges 121.

Pads 116 and 126 have been described as being made of rubber, elastomeric or other flexible materials. The elastic properties of such materials allow a pre-pierced orifice or channel such as the slit 118 or the slit 128 to act as an air-tight seal, but at the same time allow to readily respond to pressure stresses directed either towards or from the internal volume of the cartridge. In other words, such pads act as valves or baffles.

Therefore, a cartridge comprising such pads requires no means for plugging the cup port—or the lid port, if the pad is applied to the lid port in a way similar to that described above—, such as films or pierceable diaphragms. At the same time, after the extraction phase has terminated, the sudden fall of internal pressure causes the slit to return in the initial rest condition, thus preventing possible internal fluid residuals to drip out of the cartridge.

Beyond its valve-like functioning that protects the cartridge from negative environment influences, at the same time permitting degassing of the cartridge and the extraction fluid to drop after extraction, the above described pad also allows the insertion of liquid inert gas from the outside by means of a hollow needle during the packaging phase (MAP), in order to condition the capsule and prepare it for longer storage periods. The rubber pad then closes automatically by its own elasticity after the needle for inserting the gas has been pulled out. The same needle may be the one that pierces the pad so as to form the slit referred to above.

At the same time, another important advantage brought by the pads according to the invention is the great improvement in the forming and stability of the appreciated cream layer on top of the extraction beverage, which is usually identified with the Italian term "crema" when referred to espresso coffee extraction methods.

The espresso extraction method results in a polyphasic beverage constituted by a foam layer of small bubbles with dispersed fine particles that create the typical and particular tiger-tail pattern on top of an emulsion of microscopic oil droplets in an aqueous multi-component solution with dispersed gas bubbles and solid particles.

The foam formation is related to surfactants naturally present in coffee and to a number of phenomena which are triggered by espresso extraction methods.

The supernatant foam of espresso coffee or crema is an extremely important organoleptic characteristic and represents a mark of distinction between espresso coffee and other preparations.

It is well known that the foam characteristics are the signature of a perfect preparation, being any error (for instance in coffee grinding, water temperature, water pressure, percolation time and/or beverage volume, etc) or any change (coffee blend, roasting, etc.) immediately denounced by the colour, the texture and the persistence of espresso foam.

As described above, the valve means according to the preferred embodiment of the invention comprise at least a rubber or rubber-like pad or disc having a through slit whose diameter is very small, e.g. in the order of 0.1 to 0.5 mm when it is opened. Forcing the extracted coffee through it has been found to greatly increase the density and the stability of the crema. This effect is a very advantageous one since, through the integration of a means of a relatively light weight and of simple nature, it is possible to achieve an important effect that characterizes the quality of an espresso coffee beverage.

Moreover, since the rubber pad for crema formation is integrated with the cartridge, which is generally a disposable one, it is guaranteed that the extracted espresso coffee has a layer of crema of the best quality, contrary to the known espresso coffee machines in which the devices that enhance the formation of crema are part of the machines, they are used for a great number of extraction processes and may deteriorate the quality of the extracted coffee over time.

Cartridges according to the invention are not to be limited to the substantially cylindrical cartridges described here above. Particularly, the term "cylinder" has to be read in a broad general meaning and indicates the surface traced by any line moving parallel to a fixed axis and intercepting a closed line. For instance, the main body of the cartridge according to particular embodiments of the invention can be either parallelepiped-shaped or discoid-shaped, too. Furthermore, the term "substantially cylindrical" also indicates cylindrical cartridges having a slight frustum shape, that is to say, for instance, the slope of the sidewall of a cartridge according to the invention can deviate for 1-2 degrees from a perfect cylindrical surface.

A parallelepiped-shaped cartridge, not shown in the Figures, is particularly a preferred one when small space occupancy is required.

Figure 8:
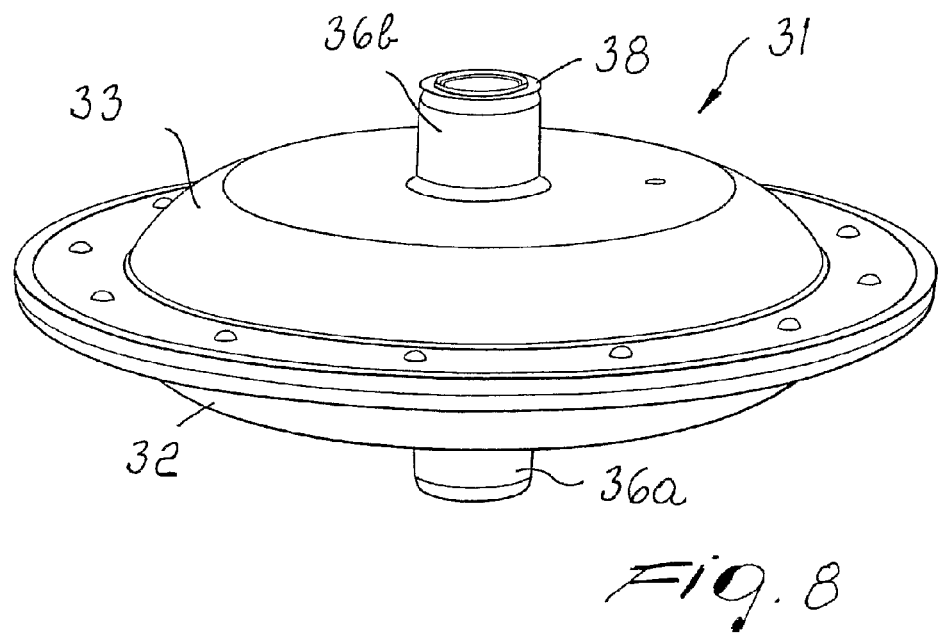
FIG. 8 is a perspective view of a cartridge according to a fourth embodiment of the invention.

A discoid-shaped cartridge, instead, can be advantageously provided in the alternative for other reasons, which will be now explained. An exemplary embodiment of the invention in which the main body of the cartridge is substantially discoid-shaped is depicted in FIGS. 8 and 9. A cartridge 31 of this kind embodies some of the features of the above cartridges, in particular it comprises a cup portion 32 and a lid portion 33, both of them having substantially the shape of a dish.

The cup portion 32 comprises a base 37, an annular sidewall and a flanged rim 39a that is directed substantially parallel to the base 37 and, similarly, the lid portion 33 comprises a base, a sidewall and a flanged rim 39b that is shaped so as to engage with the rim 39a, thus defining an internal volume of the cartridge. The internal volume of the cartridge is shaped so as to fully house a ground coffee tablet or cake 34 of a known kind, such as the tablet called E.S.E.®.

Such known tablet comprises a dose of ground coffee encapsulated within a filter paper sachet, whose peripheral edge is tightly retained by rims 39a and 39b when the cartridge 31 is in the assembled condition. Rims 39a and 39b may be reciprocally fixed using any known method such as ultrasonic welding, hot element welding, or other welding techniques, gluing or combinations of these with common border forging or deforming methods.

The cup portion 32 further comprises a substantially cylindrical cup port 36a protruding outwardly with respect to the internal volume of the cartridge 31, which is advantageously provided with inside hurdles 137a and 134a for breaking direct fluid flows passing through the cup port, which are similar to the above described hurdles 117a, 117b, 114.

The base 37 comprises a plurality of ridges 131 distributed on its planar inner side, which define a plurality of small channels between the tablet 34 and the base 37. The ridges 131 surround a central annular recess 35, similar to the above described recesses 15 and 25, on which a rubber pad 136 leans.

The pad 136 has a through, normally closed slit at its centre and supporting ribs on its top surface for supporting the tablet 34 and allowing fluid passage there-between. It is seen that the pad 136 is similar to the above described pad 126.

A lid port 36b protrudes from the central region of the lid portion 33 and comprises reciprocally facing hurdles 137b on its internal surface.

FIG. 9 is a cross-sectional view of cartridge 31 and, as such, shows only one hurdle 137b, but it is understood that an identical hurdle is present on the opposite side of the internal surface of the lid port that faces the depicted one. Moreover, the opening from which the lid port 36b protrudes out is bridged by a fluid flow barrier 134b, that is substantially analogous to the above described barrier 104b.

The lid port 36b is plugged by a film of aluminium or polylaminate plastics 38, that forms an air-tight seal for the lid port before installing the cartridge into an espresso coffee machine. The film 38 is preferably pierceable by the injection needle of the machine, but a manually removable film may be provided in the alternative.

As in the cartridges depicted in FIGS. 5 and 6, the lid portion 33 comprises sparse ridges on the surface directed towards the internal volume, which define a very small gap between the coffee tablet 34 and the lid portion itself.

The cartridge 31 is particularly advantageous in that it is fully compatible with existing coffee tablets. The manufacturing process of this cartridge is also sped up, since no further filtering means have to be inserted into the cartridge.

Moreover, it is seen that the cartridge 31, as well as the other cartridges described above, is an all-in-one cartridge, that is to say a cartridge in which most of functional features of standard espresso coffee machine, such as filtering, water distribution, crema enhancement and beverage delivery are integrated into the cartridge itself. The espresso coffee machine functions are mainly to support the cartridge and to inject water under pressure inside it.

Figure 10:
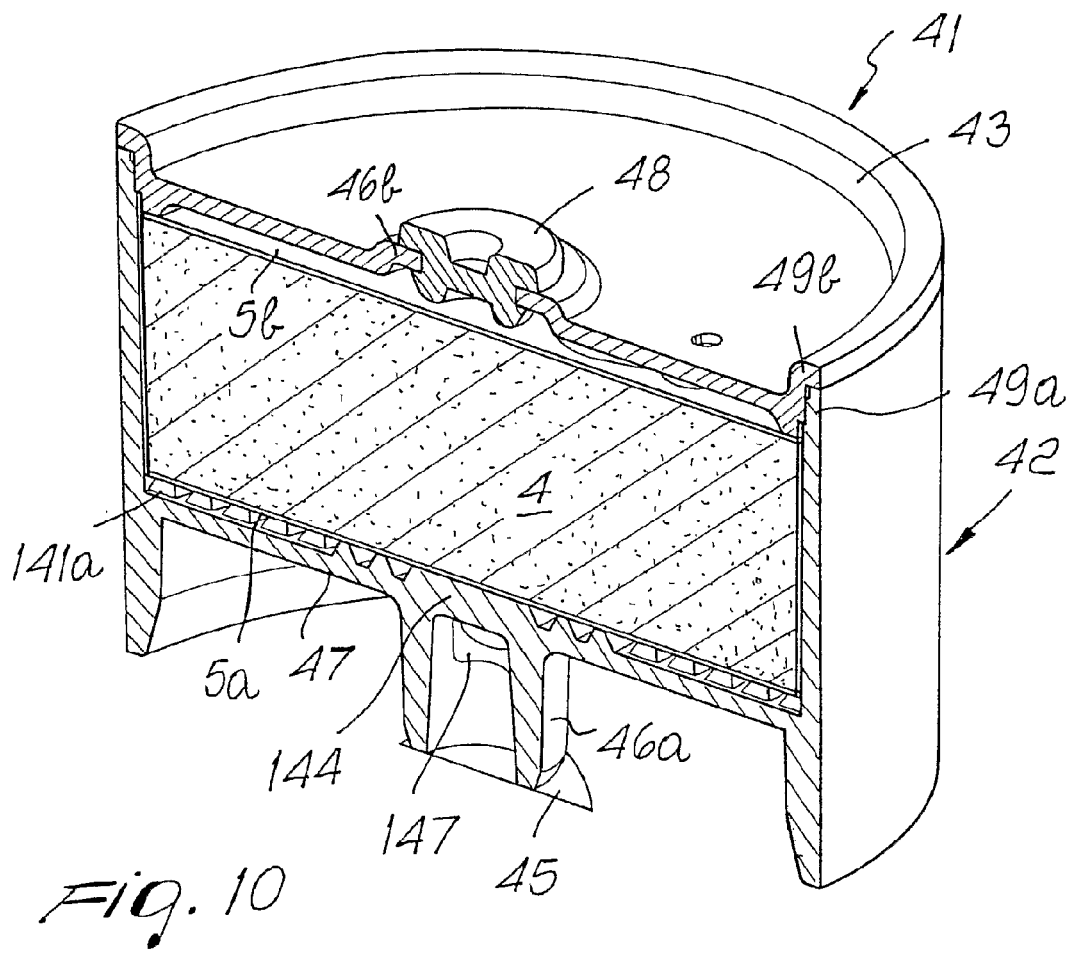
FIG. 10 is a perspective cross-sectional view of a cartridge according to a fifth embodiment of the invention.

FIG. 10 is a cross-sectional view of a cartridge 41 according to yet another embodiment of the present invention. This cartridge comprises most of the features of cartridge 1, that is to say a cylindrical cup portion 42 whose base 47 comprises a plurality of ridges 141a and a spout 46a with fluid flow hurdles 144 and 147, a dose of ground coffee 4 and filter paper sheets 5a and 5b. An aluminium or multilayered plastics film 45 plugs the external mouth of the spout 46a and it is manually removable.

Differently from the embodiment of cartridge 1, the lid portion 43 having a substantially flat shape is provided, comprising a lid port 46b which only slightly protrudes from the plane of the lid portion and an annular edge 49b that slightly protrudes from the contour of the lid portion.

Figure 11:
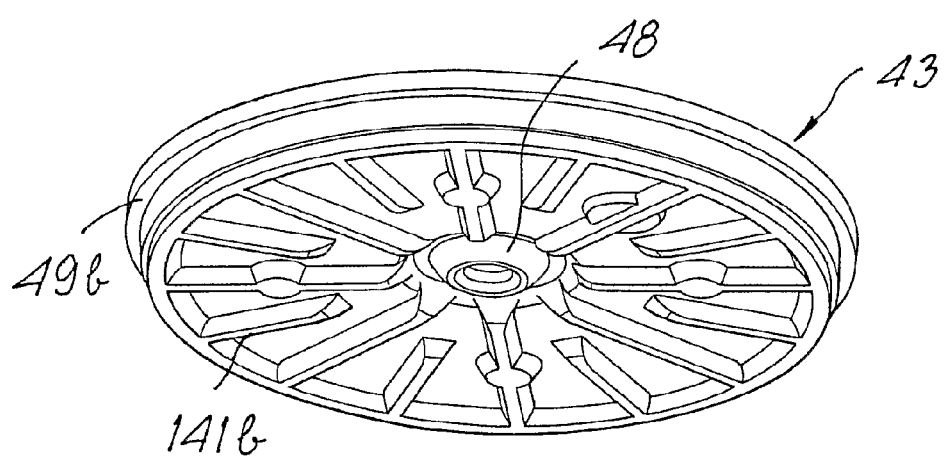
FIG. 11 is a perspective view of the inner side of the lid portion of the cartridge of FIG. 10.
Figure 12:
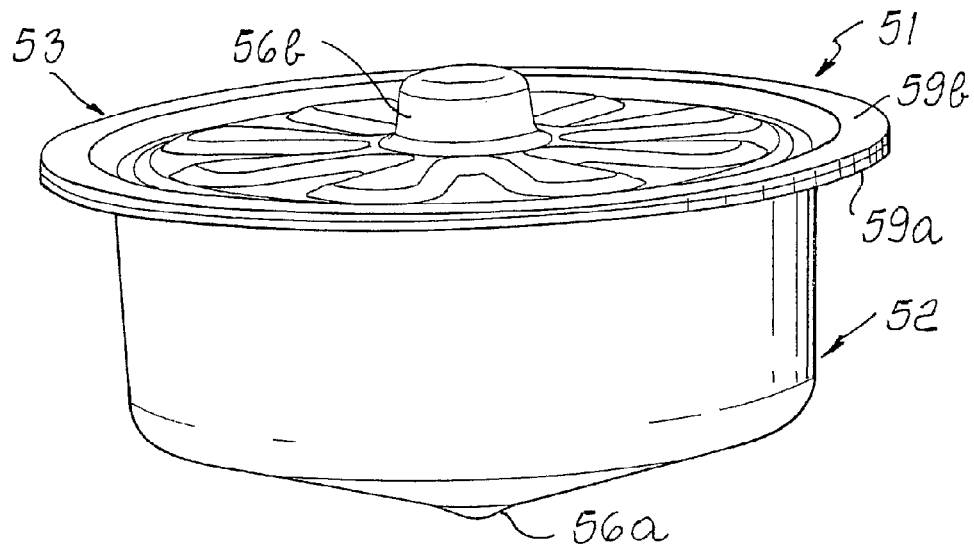
FIG. 12 is a perspective view of a cartridge according to a seventh embodiment of the invention.

With reference to FIGS. 10 and 11, the inner side of the lid portion 43 comprises sparse radial ridges 141b that slightly protrude towards the internal volume of the cartridge, so as to create a small gap between the upper filtering means 5b and the lid portion 43.

Moreover, the lid portion 43 comprises a rubber/rubber-like plug or seal 48 that engages the mouth defined by the lid port 46b. The plug 48 is preferably made of a thermoplastic elastomer (TPE) such as EPR or SBS and has a central thinner portion that is pierceable, for instance by an injection needle or a nozzle of the espresso coffee machine, and has a thicker portion surrounding such central portion that grips the mouth of the lid port 46b.

The thicker and central portions of the plug 48 are sized so as to sealingly engage with the tube or nozzle that delivers water to the cartridge. In other words, the plug 48 acts as a radial fluid-tight seal for the injection tube or nozzle, thus preventing the injected water to splash out of the lid port 46b during the beverage extraction phase.

As the extraction phase is terminated and the cartridge 41 is separated from the injection nozzle, the plug 48 elastically returns to a rest position due to its resilient nature and, even though it has been pierced, it is a good retainer for solid and fluid residuals, which are kept inside the cartridge as soon as it is removed from the machine.

While the plug 48 has been illustrated inside the cartridge 41, it is understood that such plug can be applied to any other cartridge according to the invention, such as to the cartridges previously described.

Figure 27:
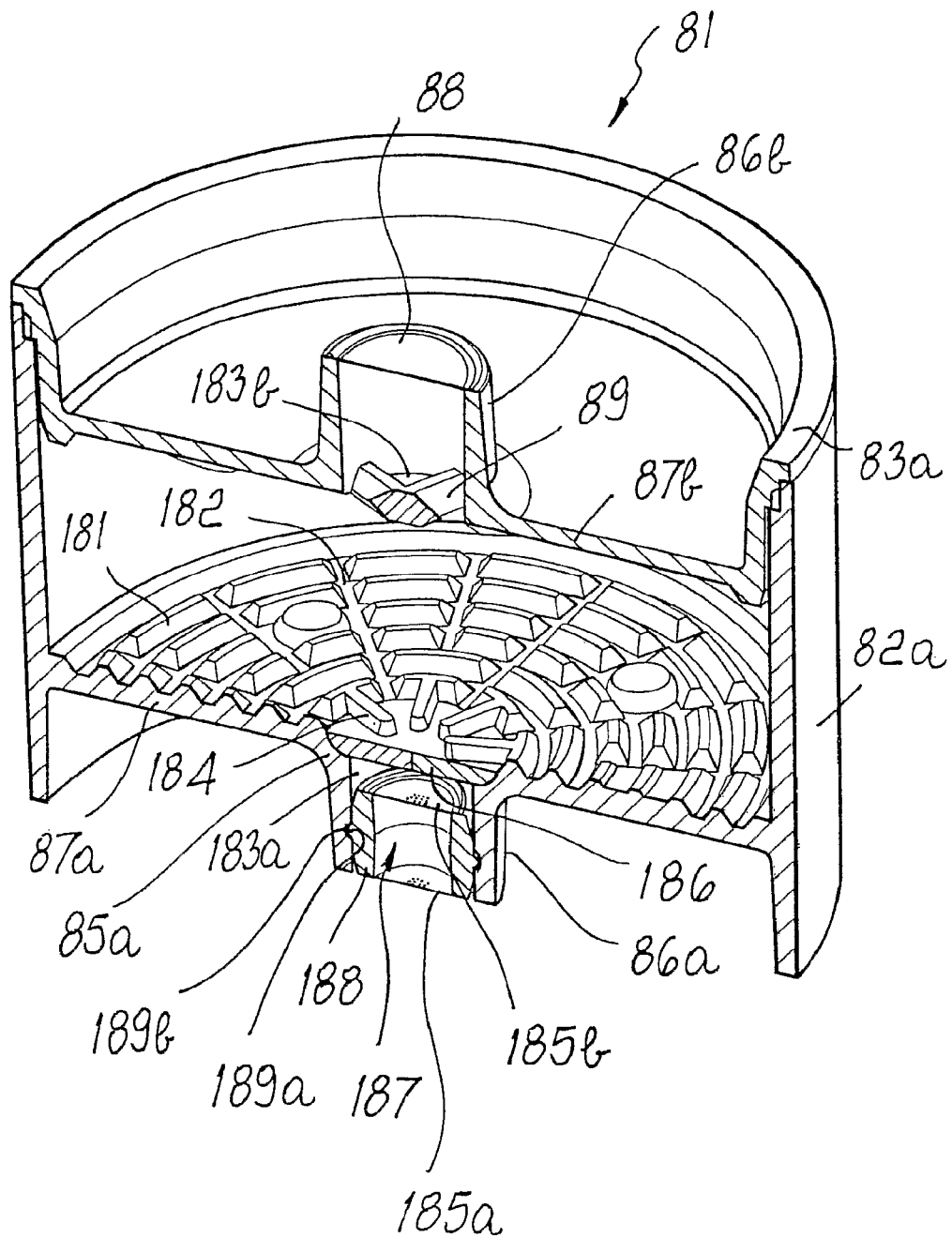
FIG. 27 is a perspective cross-sectional view, taken along a radial plane, of the cartridge according to a further embodiment of the invention.

FIG. 27 depicts a cartridge 81 according to a further embodiment of the invention. This cartridge comprises features substantially corresponding to those of cartridge 21, that is to say a cylindrical cup portion 82a whose base 87a comprises a plurality of ridges 181 and channels 182 directly formed thereon and an externally protruding cup port 86a, a lid portion 83a being fixedly attached to the upper rim of the cup portion 82a so as to define an internal volume in which a cake of ground coffee and filtering means (not shown) are housed.

The lid portion 83a comprises a base 87b, on which sparse ridges are formed similar to ridges 111b, and comprises a normally closed lid port 86b, which is preferably located in a central region of the base 87b and protrudes outwardly with respect to the internal volume of the cartridge 81. The lid port 86b is plugged by an aluminium or polylaminated plastics film.

The internal surface of the lid port 86b is substantially smooth and a cross-shaped fluid flow hurdle 89 quarters the opening 183b from which the lid port 86b protrudes. The hurdle 89 preferably protrudes towards the internal volume of the cartridge, so that the filtering means that covers the cake of particulate substance is kept at a distance away from the base 87b of the lid portion 83a.

The diameter of the lid port 86b is generally wider than the ones of the other lid ports described above, in order to completely receive a water injection nozzle without the need of using a needle for accessing the internal volume of the cartridge. The internal diameter of the lid port is preferably at least 5 mm wide, but such diameter may be even wider, e.g. it may be substantially equal to the diameter of the lid base 87b.

The ridges 181 of base 87a surround a central annular recess 85a formed around the opening 183a from which the cup port 86a protrudes. The ridges that closely surround the opening 183a comprise projections 184 that radially extend towards the center of the opening 183a and that are as thick as the ridges 181 themselves. The projections 184 act both as a support for the cake of particulate substance and the filtering means and as a fluid flow hurdle for breaking direct fluid flow.

The cartridge 81 further comprises a rubber pad 186, which is installed between the projections 184 and the annular recess 85a and which comprises a central through slit. The rubber pad 186 is a valve means as intended above.

The cup port 86a advantageously comprises a fluid flow hurdle 187, which is a separate piece that is inserted into the cup port and is tightly engaged with the internal surface of the cup port. Providing a separate fluid flow hurdle and eliminating the hurdles directly formed on the internal surface of a port is an advantageous arrangement that is particularly suited for the so-called sequential moulding manufacturing techniques.

The "separate" hurdle 187 preferably comprises a small plastic hollow tube 188 whose open ends are closed with a fluid permissive filter material, for instance a film of plastic sieve material or open mazed tissue/paper. Alternatively, internal barriers can be formed on the internal surface of the tube 188, which are substantially similar to barriers 114, 117a and 117b described above.

In the embodiment depicted in FIG. 27, the tube 188 comprises an upper sieve film 185b and a bottom sieve film 185a. In order to fix the hurdle 187 to the inner surface of cup port 86a, the tube 188 comprises an annular rib 189a on its outer sidewall for snap-fitting with a corresponding annular recess 189b formed around the inner surface of the cup port 86a. Obviously, many other arrangements for fixing a separate hurdle means to the cup port or the lid port are clearly in the reach of the skilled in the art.

With reference to FIGS. 12-15, a cartridge or capsule 51 according to a further embodiment of the invention comprises a cup portion 52 having a closed base 57 and a peripheral flange 59a on its mouth. A substantially flat lid portion 53 is fixedly attached to the cup portion 52, for instance by axially hot welding the peripheral edge 59b of the lid portion 53 to the flange 59a. Obviously, any other known joining technique can be provided in the alternative for fixedly attaching the lid portion to the cup portion, such as ultrasonic welding, bonding or combinations of these with forging or deforming techniques.

The lid portion 53 comprises a normally closed lid port 56b having an M-like cross section and further comprises bulges 151a and 151b, for creating a small gap between the lid portion and a dose of ground coffee 54 filling the capsule 51 and sandwiched between filtering means, such as filter paper sheets.

The base 57 and the dose of ground coffee form a substantially conical hollow volume in which a tappet 159 is housed. The tappet is herein defined as a piercing member of a substantially hard material such as plastics having a sort of spike 156 protruding out from a supporting portion 157 of the tappet.

Figure 13:
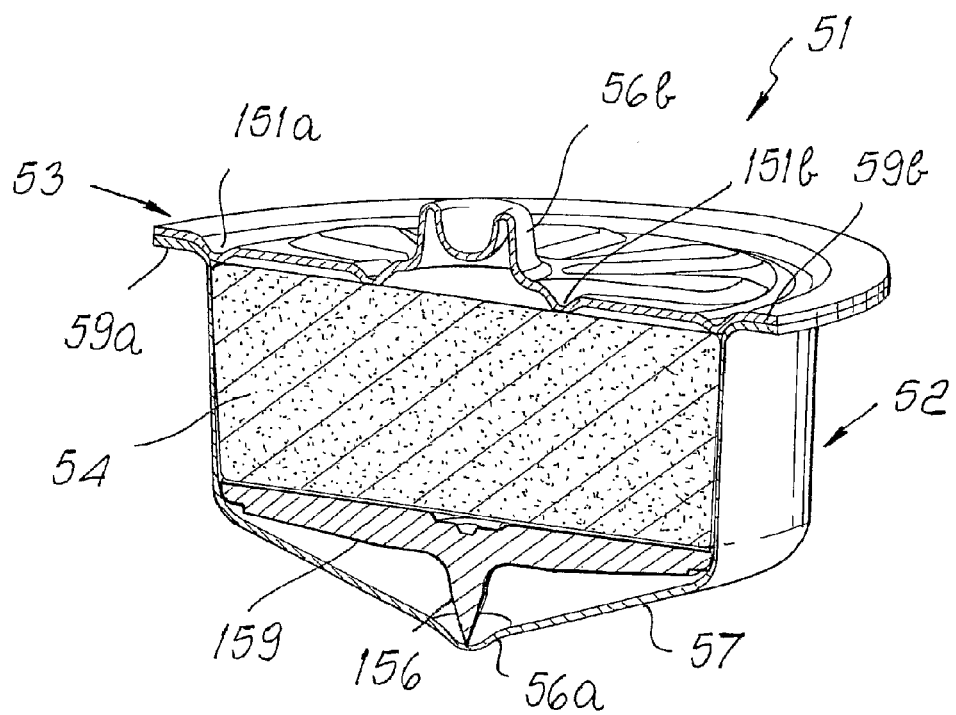
FIG. 13 is a perspective cross-sectional view of the cartridge of FIG. 12, taken along a radial plane.
Figure 14:
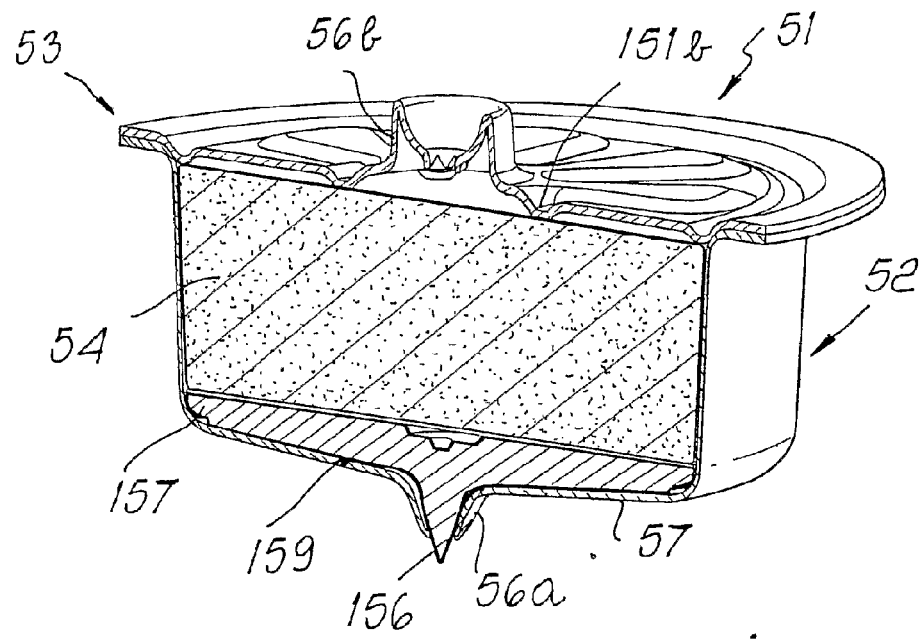
FIG. 14 is a perspective cross-sectional view, taken along a radial plane, of the cartridge according to the seventh embodiment of the invention in a pierced state.

The tappet 159 is arranged inside the above mentioned conical hollow volume so that the tappet 159 normally holds on the cup port 56a by means of the spike 156, as shown in FIG. 13.

In the preferred embodiment, the supporting portion 157 of the tappet is a disc extending throughout the bottom surface of the dose of ground coffee, which disc comprises a plurality of through holes 55 evenly distributed on its top surface. Furthermore, the bottom side of tappet 159 preferably comprises radial ribs 154, 158.

Figure 15:
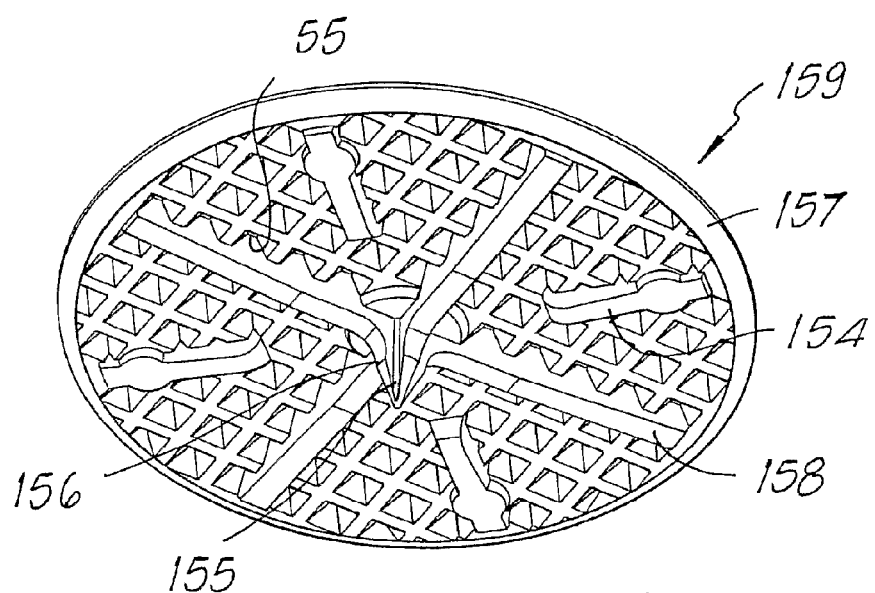
FIG. 15 is a perspective view of the tappet assembly housed in the cartridge of FIG. 12.

In the preferred embodiment depicted in FIG. 15, the tappet 156 comprises surface grooves 155 running along a longitudinal direction from the tip end of the spike towards the bottom surface of the disc 157, so that the spike 156 resembles the tip end of a Philips screwdriver. Obviously, this shape is only optional and other alternative shapes can be provided for the spike 156, as long as these shapes allow the tappet to pierce the base 57 of the capsule.

At the beginning of the beverage extraction phase, when the filter holder is inserted into the bayonet holder, a mechanical pressure is applied to the base 57, which tends to warp towards the tappet. As a consequence, the cup port 56a is pierced by the spike 156 and an outlet for the extracted beverage is thus automatically created. A gap for conveying the extracted beverage to the outside is maintained by the ribs 154, 158 and by the grooves 155.

The lid port 56b is instead pierced by the injection nozzle of the extraction machine and the injected water is spread over the top surface of the ground coffee by means of the surface shape of the lid portion 53.

The capsule 51 is preferably manufactured by thermoforming, starting from a film or sheet of polylaminate thermoplastic or thermoset plastic materials, for instance a multilayer sheet comprising PE, PET and PVDC. With this manufacturing technique, the resulting capsule is very light and handy and uses a modest amount of packaging materials, too.

It is thus seen that even capsule 51 integrates most of features of standard extraction chambers and, as well as the other cartridges according to the invention, it ensures an air-tight preservation of the ground coffee.

Moreover, during the extraction phase, a spout is automatically formed at the cup port 56a, by means of which the extracted beverage is delivered directly to an external drinking cup or glass without contaminating the cartridge or filter holder.

Various embodiments of the cartridge according to the invention have been described hereinabove. According to a second aspect of the invention, an extraction assembly for application to standard espresso coffee machine or to another machine which can pump hot water or other infusion fluids under pressure for producing beverages will be now described in detail.

Figure 16:
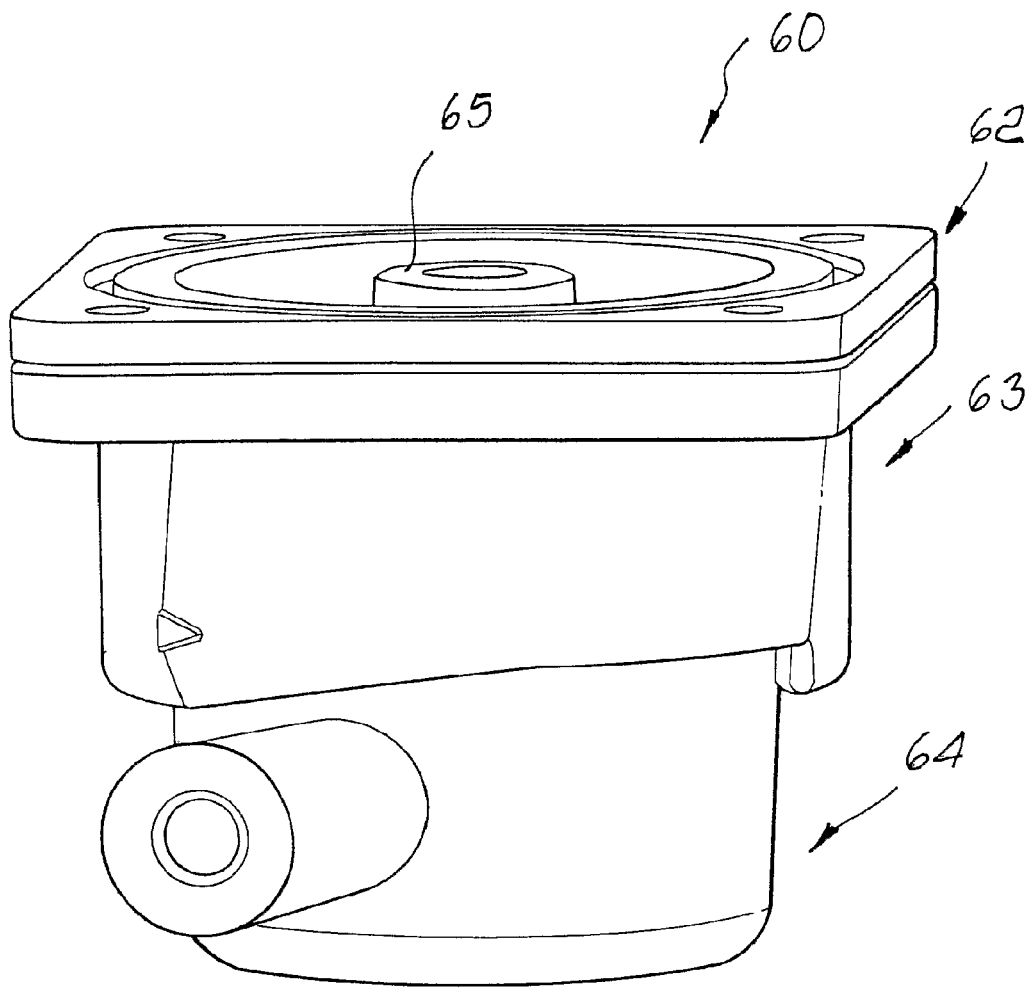
FIG. 16 is a perspective view of an extraction assembly according to a second aspect of the invention.
Figure 17:
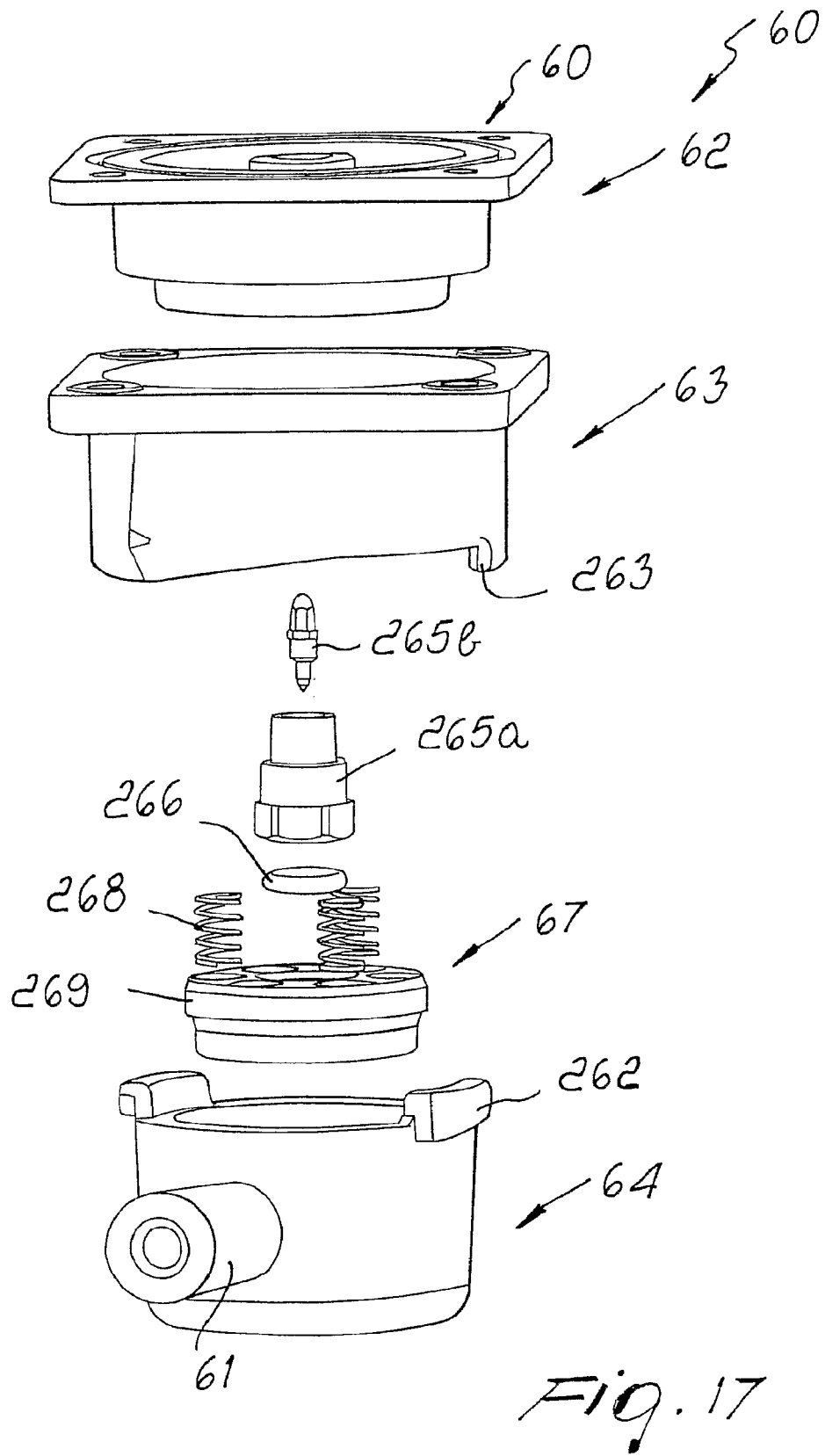
FIG. 17 is an exploded view of the extraction assembly of FIG. 16.
Figure 18:
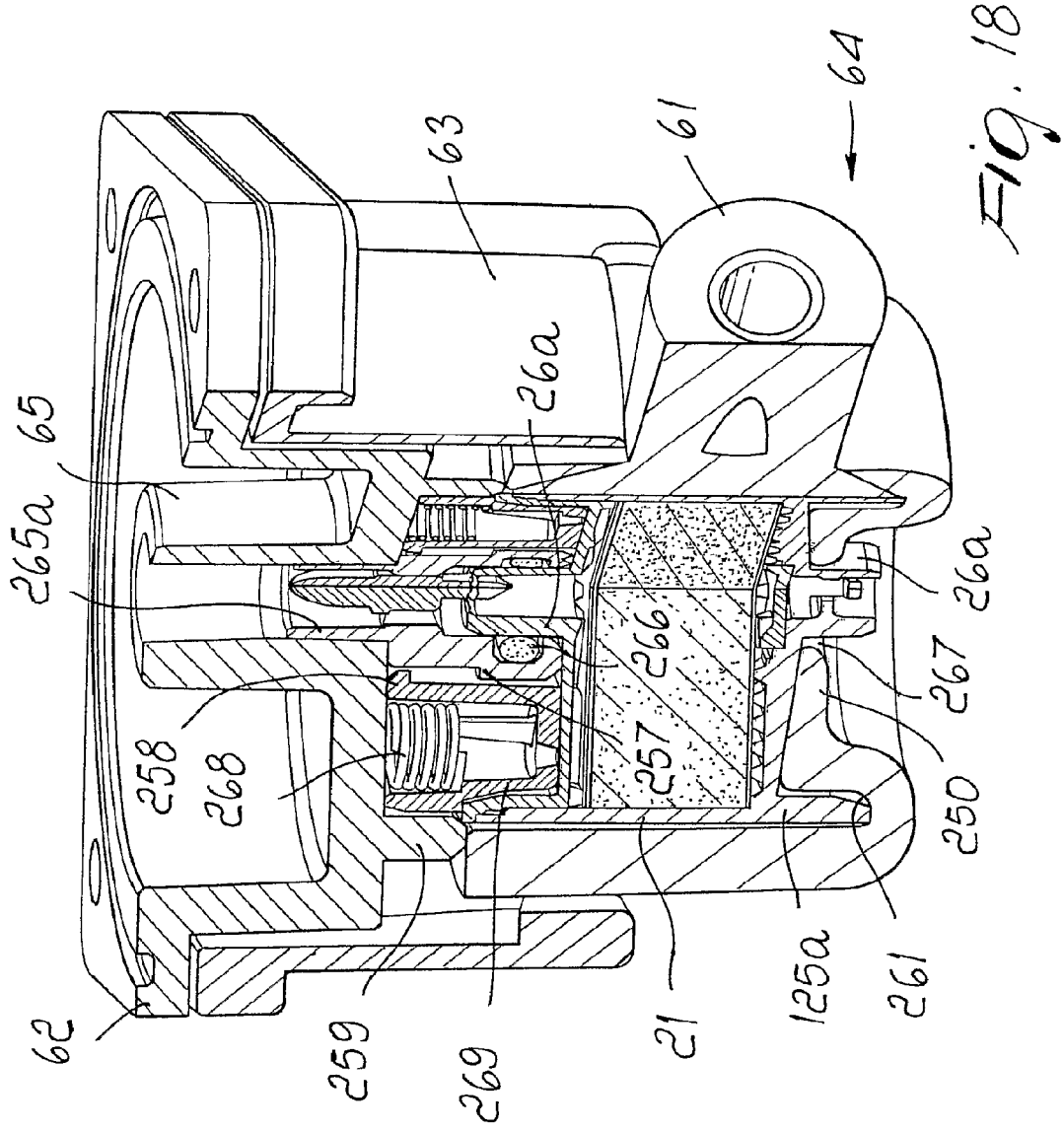
FIG. 18 is a perspective broken away view of the extraction assembly of FIG. 16 arranged in the beverage extraction position, having a cartridge installed therein.

With reference to FIGS. 16-18, an extraction assembly 60 according to a preferred embodiment of the invention comprises a support connectable to an espresso coffee machine, which is preferably composed of a connector member 62, for connecting the extraction assembly to the water injection tube of the beverage extraction machine, and a bayonet holder 63.

The connector member 62 has a base and a cylindrical sidewall raising from the base and ending with a flanged rim that serves for mounting the support on the extraction machine (not shown), for instance by using screws. The base of the connector member 62 comprises a protruding inlet port 65 connectable to the water outlet of the extraction machine and, on the opposite side of the base, a circular guiding wall 259, which is described hereinafter.

The bayonet holder 63 has a substantially cylindrical shape and comprises an upper open end into which the cylindrical sidewall of connector member 62 fits. Preferably, the bayonet holder 63 is fixed to the connector member 62 by means of the same screws used for mounting the connector member to the extraction machine. Obviously, the bayonet holder and the connector member may be reciprocally fixed in any other known way; for instance, the outer surface of the cylindrical sidewall of the connector member and the upper inner surface of the cylindrical sidewall of the bayonet holder may be threaded. Alternatively, the connector member and the bayonet holder may be built as a single piece.

The bayonet holder 63 further comprises a bottom open end on which guides 263 of a known kind are provided for bayonet fitting with a cartridge holder 64, which is provided with a grip handle 61.

The cartridge holder 64 comprises a substantially cylindrical body that is internally shaped so as to completely house the cartridge 21. In particular, it comprises a cylindrical sidewall that is complementary to the sidewall 28 of the cartridge.

Moreover, the base of the cartridge holder 64 comprises an annular groove 261, into which the flange 125a of the cartridge fits slidingly, and a bottom 250, which is located inside the cylindrical body of the cartridge holder and comprises an opening 267 at its central region.

The depth of the annular groove 261 is substantially equal to the height of the flange 125a, so that when cartridge 21 is inserted into the cartridge holder 64, the surface of the base 27 leans almost completely against the bottom 250 and the cup port 26a protrudes from the opening 267.

Therefore, the internal shape of the cartridge holder 64 substantially corresponds to the external shape of the cartridge 21, thus assuring a tight fit of the cartridge within the holder.

The extraction assembly 60 further comprises an injection nozzle assembly 265a, 265b that is firmly mounted on the bottom open end of the inlet 65 facing the cartridge holder, for instance by a thread fitting. Alternatively, the nozzle assembly and the water inlet port 65 may be made in a single piece.

Figure 21:
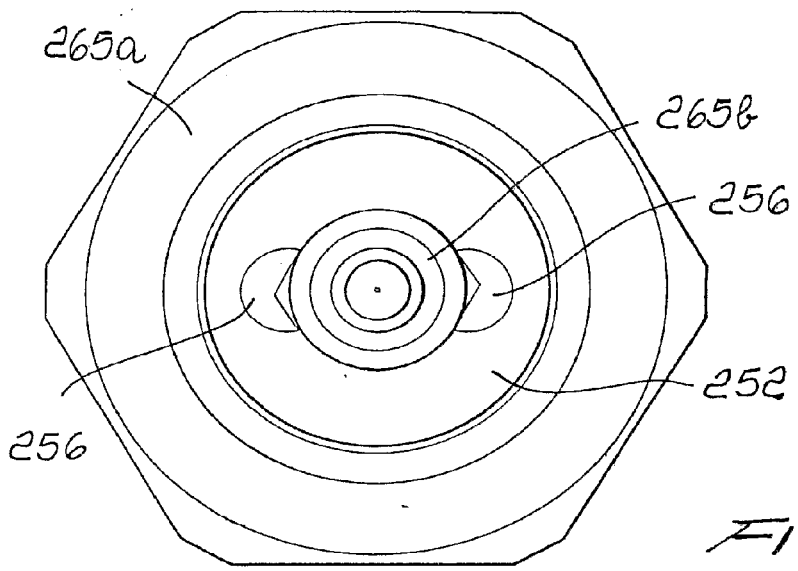
FIG. 21 is a bottom view of the nozzle used in the extraction assembly of FIG. 16.
Figure 22:
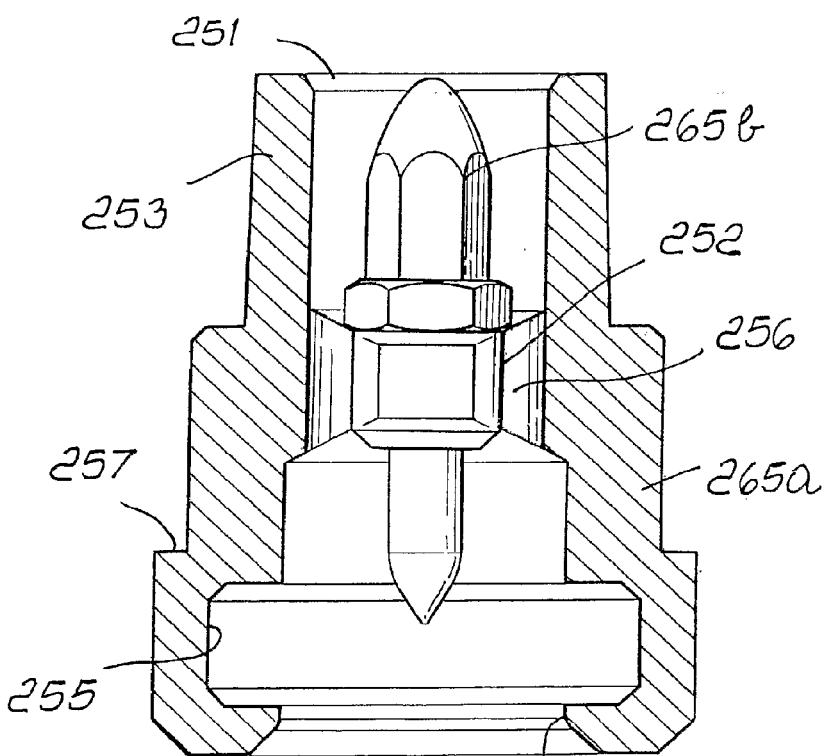
FIG. 22 is a partial cross-sectional lateral view of the nozzle used in the extraction assembly of FIG. 16.

With reference to FIGS. 21 and 22, the nozzle assembly comprises a hollow nozzle body 265a and a piercing member or needle 265b fixedly mounted to the inner surface of the nozzle body. More in detail, the nozzle body is substantially tubular and comprises two open ends 251 and 254.

The open end 254 is located at the bottom end of the nozzle body and it is wide enough to receive a projecting lid port of a cartridge according to the invention, for instance lid port 26b.

The open end 251 is defined at the upper end of the nozzle body by the wall 253, which is shaped so as to tightly fit with the inner surface of the bottom open end of the inlet 65. The external surface of the upper wall 253 and the internal surface of the inlet 65 may be threaded so as to secure the nozzle body to the connector member 62. Alternative arrangements for coupling the nozzle assembly to the inlet of the connector member may be also provided, as long as a fluid tight fit is guaranteed between them.

The external surface of the nozzle body 265a comprises a radially protruding stepped portion 257 for limiting the axial displacement of a cartridge ejector 269, as described below. The internal surface of nozzle body 265a, instead, comprises an annular projection 252 that extends inwardly and which is preferably located in a middle region of the internal surface of the nozzle body.

The needle 265b is axially inserted and secured in the opening defined by annular projection 252. In order to allow passage of fluid from the upper open end 251 to the bottom open end 254, through openings 256 are provided in the annular projection 252.

The internal surface of the nozzle body 265a further comprises an annular recess 255, which is located in a bottom region of the same internal surface, preferably around the bottom open end 254. Such recess houses an O-ring 266, which acts as a means for providing a radial fluid-tight seal between the nozzle assembly and the inlet port 26b of the cartridge 21 during the beverage extraction phase.

A great advantage brought about by the O-ring 266 is that it prevents the injected water from contaminating any internal component or surface of the extraction assembly 60 and from lapping the outer surface of the cartridge, which has to be touched and handled by the user. Accordingly, superior hygienic conditions are guaranteed and the extraction machine can be used hundreds of times without having to clean the components of the extraction assembly, such as the cartridge holder 64 and the support 62, 63.

Such a contamination-free arrangement also advantageously combines with the integration of an outlet spout in the cartridge according to the invention. The same beverage extraction machine and the same extraction assembly can be consecutively used for cartridges containing different edible substances, such as coffee, chocolate, tea or herbal infusions, soups, other hot milk beverages, without incorporating the main disadvantage of common systems that contaminate and negatively influence the extraction results of consecutive beverage extractions.

Moreover, the resilient nature of the O-ring 266 allows to use various cartridges having inlet ports of different radial sizes, as long as these radial sized do not exceed the average diameter of the bottom opening 254 of the nozzle assembly.

In order to enhance the practicality of the extraction assembly, a cartridge ejector 269 is mounted in the annular space defined by the guiding wall 259 and the portion of the nozzle body 265a protruding out of the water inlet 65. The cartridge ejector 269 is substantially toroidal and is preferably shaped so as to fit into the annular space defined by the guiding wall 259, the base of connector member 62, the lid portion of the cartridge and the portion of nozzle body 265a protruding out of the water inlet 65 during the extraction phase.

The cartridge ejector 269 comprises a plurality of springs 268 located in respective hollow housings having an open end from which the springs can extend. The springs 268 abut against the base of the connector member 62 and against respective abutment surfaces provided inside the hollow housings of the cartridge ejector.

When the cartridge holder 64 is fixed to the bayonet holder 63, the ejector 269 is pushed towards the base of the connector member 62 and the springs 268 are compressed. As it is seen in FIG. 18, in this position the lid port 26b is pierced by the needle 265b and water can be injected inside the cartridge as described above.

Figure 20:
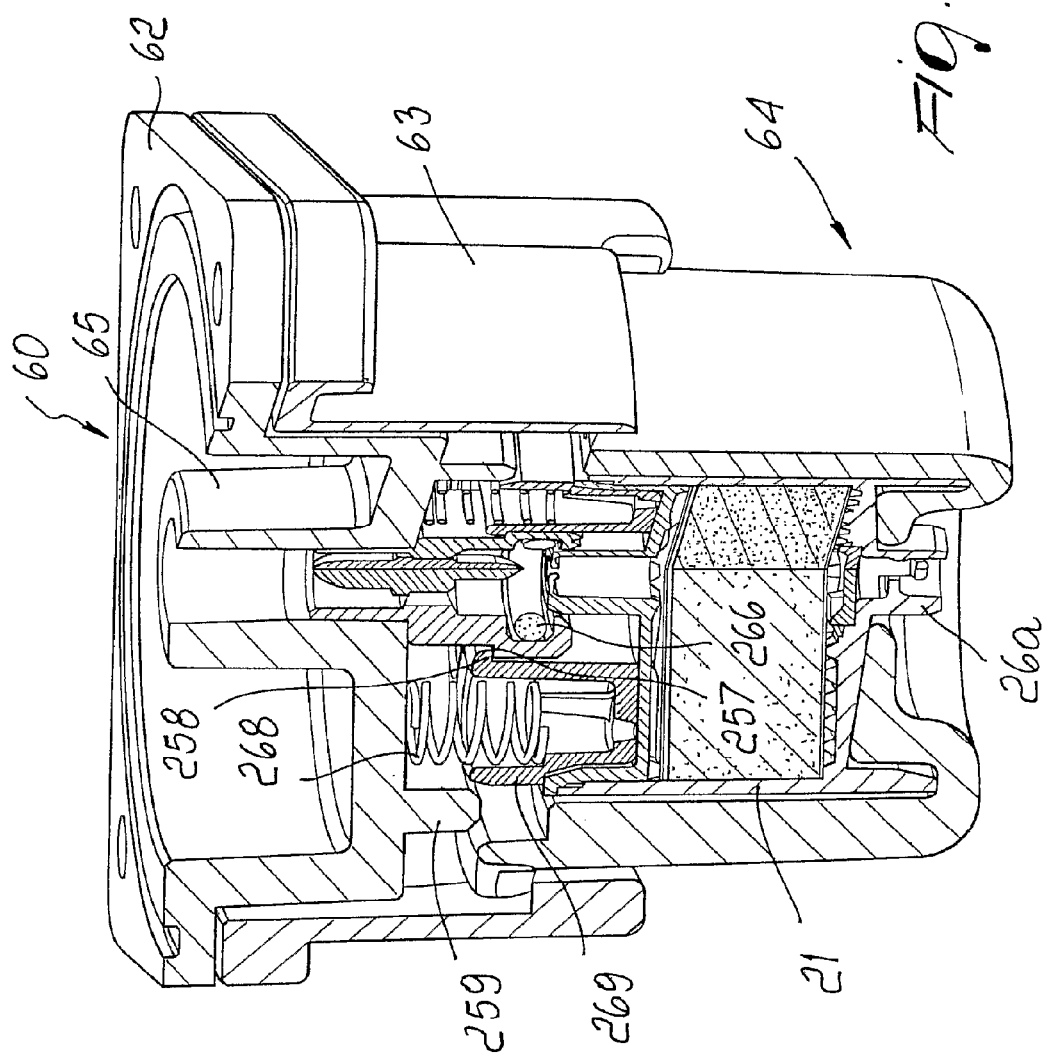
FIG. 20 is a perspective broken away view of the extraction assembly of FIG. 16 arranged in the cartridge expulsion position.

As soon as the cartridge holder is removed, the ejector 269 keeps the cartridge 21 inside the cartridge holder 64, as it is seen from FIG. 20. In order to stop the ejector's travel when the cartridge holder is released, an annular projection 258 is provided around the internal surface of the toroidal body of the cartridge ejector, which abuts against the stepped portion 257 of the nozzle body 265a when the ejector slides downwardly towards the cartridge holder.

While a particular embodiment of an extraction assembly for an espresso coffee machine has been described with reference to a cartridge of the kind shown in FIG. 6, it is understood that any equivalent extraction assembly can be provided that is particularly suited for any cartridge according to the invention.

Figure 19:
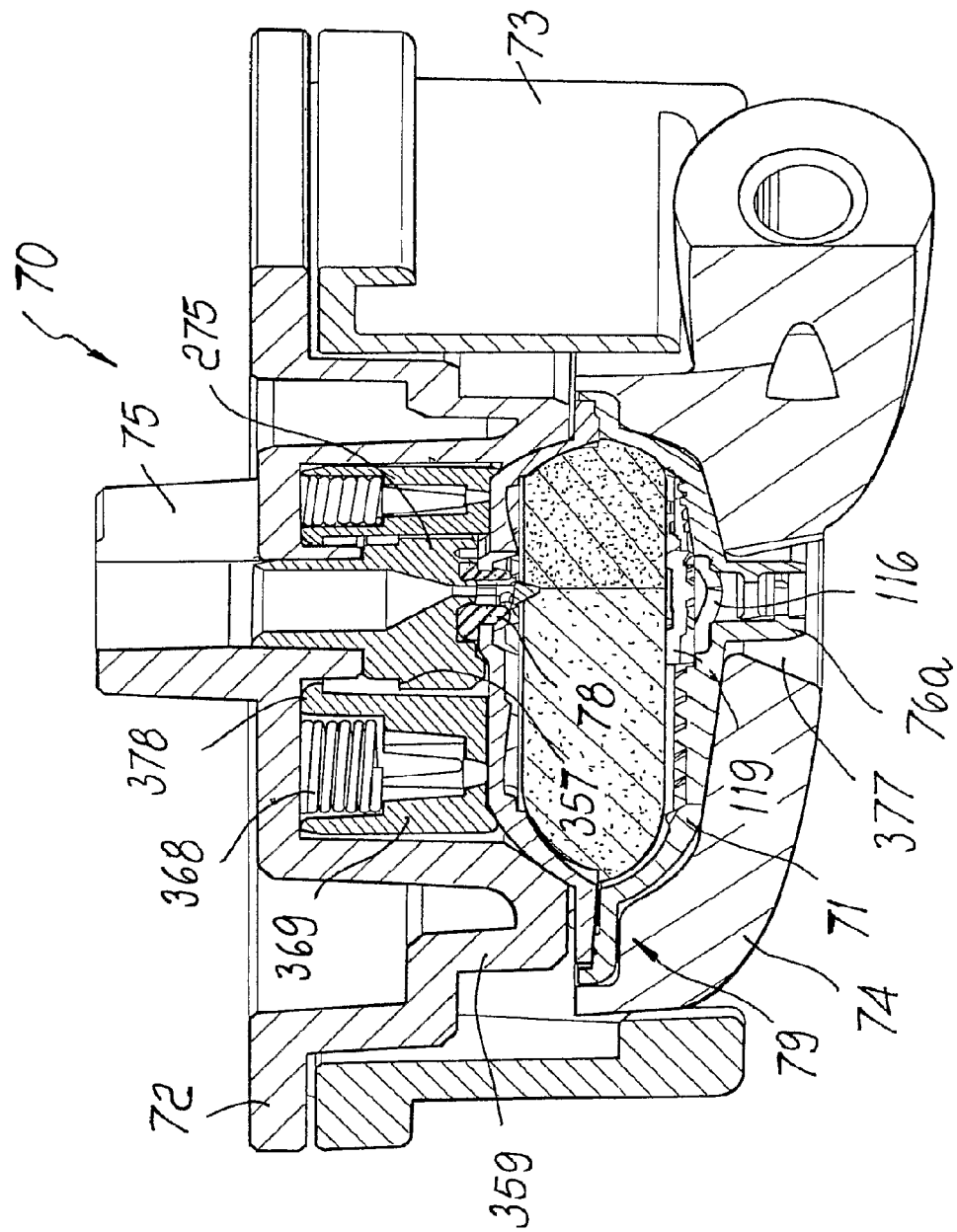
FIG. 19 is a perspective broken away view of an extraction assembly arranged in the beverage extraction position, having a discoidal cartridge installed therein.

For instance, with reference to FIG. 19, a particular extraction assembly 70 suited for a discoidal cartridge 71 according to the invention can be designed, according to the above teachings.

The discoidal cartridge 71 has not been described in detail so far, but it is immediately derivable by combining features of embodiments of the cartridge according to the invention which have already been described in detail. This combination is hereby presented to show that elements from different embodiments may be combined to obtain further embodiments that clearly fall under the same inventive concept and which are clearly in the reach of the skilled in the art.

The cartridge 71 incorporates features of cartridges 11, 31 and 41. In detail, it has a general discoidal shape and houses a coffee tablet of a known kind, as cartridge 31. The cup portion of cartridge 71 is similar to the cup portion 37, but comprises a shim 119 and a rubber valve or pad 116 of the kind used in cartridge 11; the pad 116 is depicted in a deformed condition, which is reached during the extraction phase. Differently form cartridge 31, the lid port only slightly protrudes with respect to the lid portion and it is closed by a rubber plug or seal 78, identical to the plug 48 used in cartridge 41.

Accordingly, the extraction assembly 70 comprises a support connectable to an espresso coffee machine, which is preferably composed of a connector member 72, for connecting the extraction assembly to the water injection tube of the beverage extraction machine, and a bayonet holder 73.

The connector member 72 comprises a water inlet port 75, for connection to a water injection port of a beverage extraction machine, and a annular wall 359 protruding towards the internal volume of the bayonet holder 73 when this is mounted on the connector member.

The bayonet holder 73 has a substantially cylindrical shape and comprises an upper open end into which the annular wall 359 of the connector member 72 fits. Preferably, the bayonet holder 73 is fixed to the connector member 72 by means of the same screws used for mounting the connector member to the extraction machine. Obviously, the bayonet holder and the connector member may be reciprocally fixed in any other known way; for instance, the outer surface of the cylindrical sidewall of the connector member and the upper inner surface of the cylindrical sidewall of the bayonet holder may be threaded. Alternatively, the connector member and the bayonet holder may be built in a single piece.

The bayonet holder 73 further comprises a bottom open end on which guides 263 of a known kind are provided for bayonet fitting with a cartridge holder 74.

The cartridge holder 74 comprises a substantially flattened body whose internal shape is complementary to the cup portion of cartridge 71. Moreover, the base of the cartridge holder 74 comprises an opening 377 at its central region through which a cup port 76a of cartridge 71 is arranged.

When the cartridge holder 74 is firmly secured to the bayonet holder 73, the peripheral flat rim 79 of cartridge 71 is tightly kept between the annular wall 359 and the rim of cartridge holder 74.

The extraction assembly further comprises a nozzle 275 that is secured to the inlet port 75 and that protrudes towards the cartridge holder.

Referring to FIG. 23, the nozzle 275 is a substantially cylindrical hollow piece having an inner axial cavity 359 for receiving water from the water inlet 75 and having a needle or piercing member 358 integrated therein. The cavity 359 extends as far as the needle, which is axially hollow and comprises radial through openings 356 for supplying water in a substantially radial direction.

An annular recess 355 is further provided in the nozzle 275, in particular around the needle 358. The recess 355 is shaped so as to receive the thicker peripheral portion of the plug 78 as soon as the cartridge holder 74 is secured to the bayonet holder 73. As it is noted from FIG. 19, in this position the plug 78 is pierced by the needle 358, so that water can be injected inside the cartridge, and the plug 78 provides for a fluid-tight seal between the nozzle 275 and the lid port of cartridge 71.

Therefore, the plug 78 acts as a means for providing radial fluid-tight seal between the water inlet port of the extraction assembly and the cartridge, thus preventing the injected water from lapping the external surface of the cartridge.

Advantageously, the extraction assembly 70 comprises a cartridge ejector 369 that is housed in the annular space defined by the wall 359 and the nozzle 275 and that is similar to the ejector 269.

When the cartridge holder 74 is fixed to the bayonet holder 73, the ejector 369 is pushed upwardly towards the connector member 72 by means of springs 368, which are accordingly compressed. Instead, when the cartridge holder 74 is removed from the bayonet holder 73, the ejector 269 keeps the cartridge 71 inside the cartridge holder 74. In order to stop the ejector's travel when the cartridge holder is released, an annular projection 378 is provided around the internal surface of the toroidal body of the cartridge ejector 369, which abuts against the stepped portion 357 of the nozzle body 275 when the ejector slides downwards towards the cartridge holder.

Figure 26:
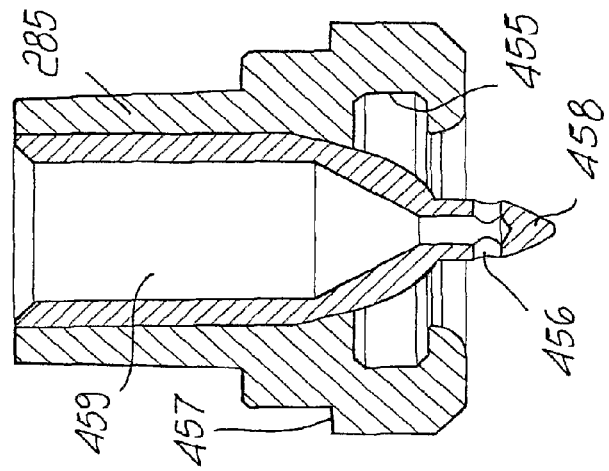
FIG. 26 is a side cross-sectional view of the injection nozzle used in the extraction assembly of FIG. 24.
Figure 25:
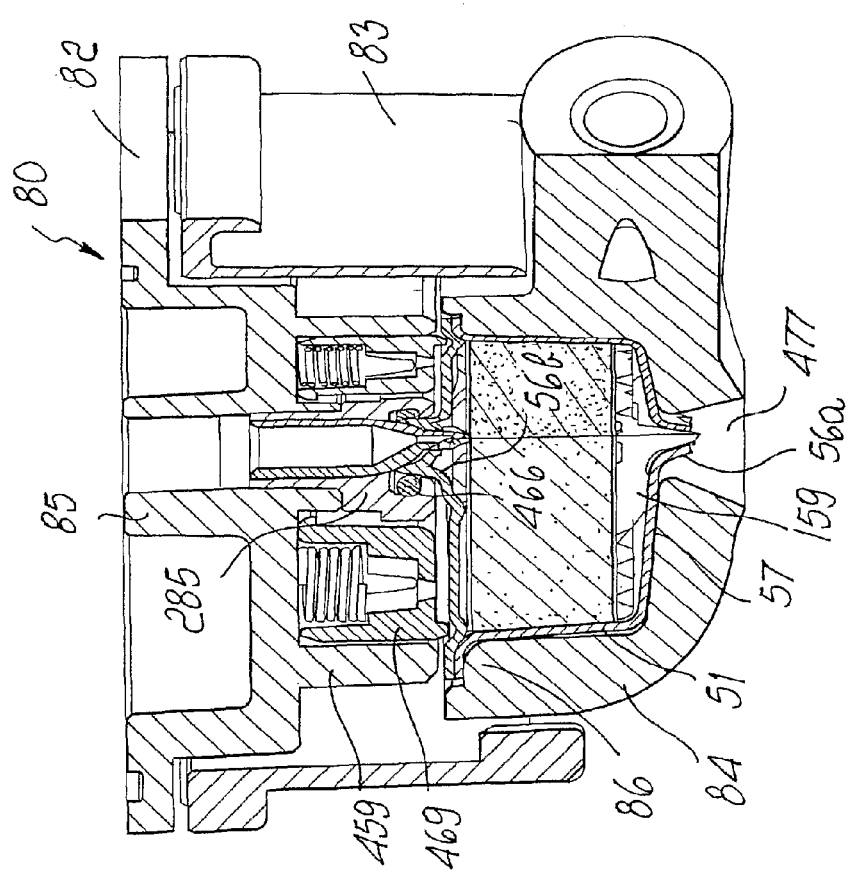
FIG. 25 is a broken away view of the extraction assembly of FIG. 24 when it is arranged in the beverage extraction position.

With reference to FIGS. 24-26, an extraction assembly 80 according to yet another embodiment of the invention comprises a support connectable to an espresso coffee machine, which is preferably composed of a connector member 82, for connecting the extraction assembly to the water injection tube of the beverage extraction machine, and a bayonet holder 83.

The connector member 82 has a base and a cylindrical sidewall raising from the base and ending with a flanged rim that serves for mounting the support on the extraction machine (not shown), for instance by using screws. The base of the connector member 82 comprises a protruding inlet port 85 connectable to the water outlet of the extraction machine and, on the opposite side of the base, a circular guiding wall 459. It is seen that the connector member 82 is substantially similar to the previously described connector member 62.

The bayonet holder 83 has a substantially cylindrical shape and comprises an upper open end into which the cylindrical sidewall of connector member 82 fits. Preferably, the bayonet holder 83 is fixed to the connector member 82 by means of the same screws used for mounting the connector member to the extraction machine. Obviously, the bayonet holder and the connector member may be reciprocally fixed in any other known way. For instance, the outer surface of the cylindrical sidewall of the connector member and the upper inner surface of the cylindrical sidewall of the bayonet holder may be threaded. Alternatively, the connector member and the bayonet holder may be built as a single piece.

Moreover, the bayonet holder 83 comprises a bottom open end on which guides of a known kind are provided for bayonet fitting with a cartridge holder 84.

In order to deliver water inside the cartridge 51, a nozzle 285 is secured to the inlet port 85 and protrudes towards the cartridge holder 84.

Referring to FIG. 26, the nozzle 285 is a substantially cylindrical hollow piece in which an inner axial cavity 459 is formed for receiving water from the water inlet 85. A hollow needle or piercing member 458 is integrated with the nozzle 285 so that the cavity 459 extends as far as the needle. Advantageously, the needle 458 comprises radial through openings 456 for supplying water in a substantially radial direction.

An annular recess 455 is further provided in the nozzle 285, in particular around the needle 458, for housing an O-ring 466, which acts as a means for providing a radial fluid-tight seal between the nozzle assembly and the inlet port 56b of the cartridge 51 during the beverage extraction phase.

Advantageously, the extraction assembly 80 comprises a cartridge ejector 469 that is housed in the annular space defined by the wall 459 and the nozzle 285 and that is similar to the ejector 269.

The ejector 469 preferably comprises a peripheral annular rib 470 on its bottom side, which is shaped so as to engage the peripheral bulge 151a of the lid portion of cartridge 51 when the cartridge holder is secured to the bayonet holder.

The cartridge holder 84 has a substantially cylindrical body that is internally shaped so as to house capsule 51. In particular, it comprises an inner sidewall that is shaped substantially complementary to the sidewall of the capsule and that ends with an annular shoulder 86 in an upper region and with an opening 477 in a bottom region of the capsule holder.

The base of the cartridge holder 84 has not the same slope of the base 57 of capsule 51. Preferably, the base region of the capsule holder 84 slopes substantially parallel to the ribs 154 and 158 of the tappet 159. Accordingly, in an initial condition in which the cartridge holder is not completely secured to the bayonet holder, the capsule 51 supports itself on the contour of the opening 477 only in correspondence of the region around the cup port 56a and the flanges 59a, 59b are in a raised position with respect to the annular shoulder 86 of the cartridge holder 84.

As soon as the cartridge holder 84 is manually rotated for securing it to the bayonet holder 83, the lid portion of the capsule 51 firstly abuts against the bottom surface of the ejector 469 and then abuts against the annular wall 459. Accordingly, a pressure is applied to the base 57 that causes the spike 156 to pierce the cup port 56a and the base 57 to buckle against the bottom side of tappet 159.

In the final position, that is to say in the position shown in FIG. 25 in which the capsule holder 84 is fully secured to the bayonet holder 83 and the system is ready for the beverage extraction phase, the cup port 56a is fully opened and the extracted beverage can be supplied directly in an external cup.

FIG. 25 also shows that, in the beverage extraction position, the nozzle 285 has pierced the inlet port 56b of capsule 51. The M-like shape of the inlet port 56b advantageously provides for an easy engagement with the needle portion of the nozzle 285.

Advantageously, as soon as the capsule holder 84 is removed from the bayonet holder, the ejector 469 keeps cartridge 51 inside the cartridge holder 84. In order to stop the ejector's travel when the cartridge holder is released, an annular projection 478 is provided around the internal surface of the toroidal body of the cartridge ejector, which stops against an abutment 57 of the nozzle body 285 when the ejector slides downwards.

The above extraction assemblies comprise an injection nozzle that is provided with a needle for breaking the plug or seal of the upper port of the cartridge and for accessing the internal volume of the cartridge. Moreover, the upper ports of the above cartridges are sized so as to be insertable into a corresponding female nozzle. However, it is possible to provide an opposite coupling between the injection nozzle and the upper port of a cartridge without departing from the scope of the present invention. For instance, with reference to FIG. 28, an extraction assembly according to another embodiment of the invention comprises a support connectable to an espresso coffee machine, which is preferably composed of a connector member 582, for connecting the extraction assembly to the water injection tube of the beverage extraction machine, and a bayonet holder 583.

The connector member 582 has a base and a cylindrical sidewall raising from the base and ending with a flanged rim that serves for mounting the support on the extraction machine (not shown), for instance by using screws. The base of the connector member 582 comprises a protruding inlet port 585 connectable to the water outlet of the extraction machine and, on the opposite side of the base, a circular guiding wall 559.

The bayonet holder 583 has a substantially cylindrical shape and comprises an upper open end into which the connector member 582 fits. Preferably, the bayonet holder 583 is fixed to the connector member 582 by means of the same screws used for mounting the connector member to the extraction machine, as in the embodiments described here above. Obviously, the bayonet holder and the connector member may be reciprocally fixed in any other known way; for instance, the outer surface of the cylindrical sidewall of the connector member and the upper inner surface of the cylindrical sidewall of the bayonet holder may be threaded. Alternatively, the connector member and the bayonet holder may be built as a single piece.

The bayonet holder 583 further comprises a bottom open end on which guides of a known kind are provided for bayonet fitting with a cartridge holder 584.

The cartridge holder 584 comprises a substantially cylindrical body that is internally shaped so as to completely house the above described cartridge 81. In particular, it comprises a cylindrical inner sidewall that is complementary to the sidewall of the cartridge.

Moreover, the base of the cartridge holder 584 comprises an annular groove 561 into which the lower flange of the cartridge 81 fits slidingly, and a bottom 550 that is located inside the cylindrical body of the cartridge holder and that comprises an opening 567 at its central region. The annular groove 561 and the bottom 550 are shaped so that when the cartridge 81 is inserted into the cartridge holder 584, the surface of its base 87a leans almost completely against the bottom 550 and the cup port 86a protrudes from the opening 567.

Figure 28:
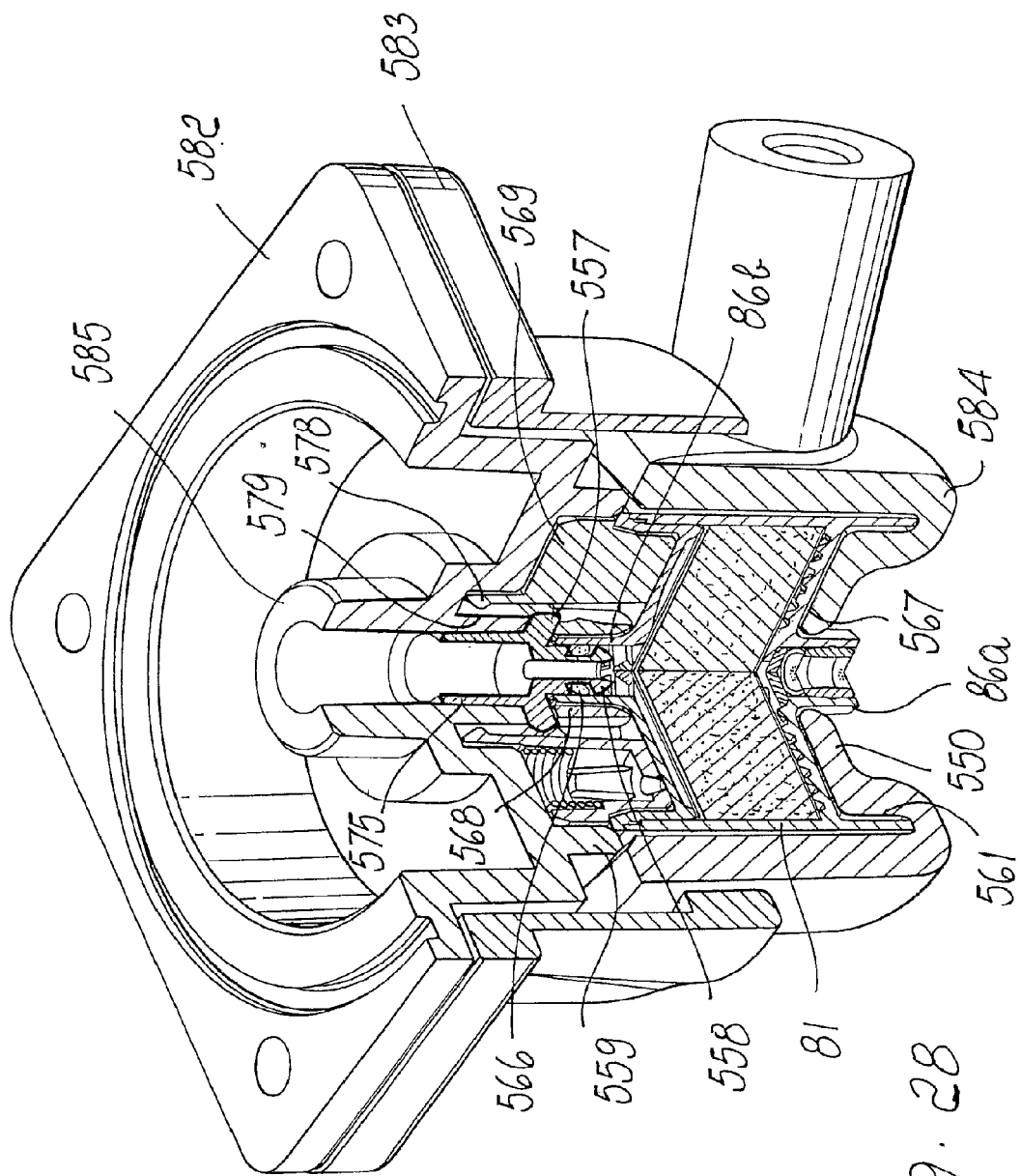
FIG. 28 is a broken away view of an extraction assembly according to a further embodiment of the invention, in which the cartridge of FIG. 27 is installed.

The extraction assembly of FIG. 28 further comprises an injection nozzle 575 that is firmly mounted on the bottom open end of the inlet 585 facing the cartridge holder, for instance by a thread fitting. Alternatively, the nozzle assembly and the water inlet port 585 may be made in a single piece.

The nozzle 575 comprises a hollow cylindrical body with opposite open ends and comprises a flange 557 in a middle region thereof.

A hollow tip end 558 of a substantially cylindrical shape protrudes axially from the flange 557 of the nozzle towards the cartridge holder and it is shaped so as to have an external diameter that is generally smaller than the inner diameter of the lid port 86b. Accordingly, the tip end 558 can be completely inserted into the lid port when the cartridge holder 584 is fixedly mounted on the bayonet holder 583, thanks to the appositely wide lid port 56b.

The tip end 558 is substantially wider than a (common) injection needle, but it is small enough to be insertable as a male part into a cartridge port such as the lid port 86b. Advantageously, the tip end 558 comprises an annular recess formed around its external surface, for housing a sealing means such as an O-ring 566.

Advantageously, the extraction assembly comprises a toroidal cartridge ejector 569, which is housed in the annular space defined by the wall 559 of the connector member and the nozzle 575 and which is similar to the other cartridge ejectors described here above.

The axial travel of the ejector 569 is limited by means of common snap-brackets 578, which extend upwardly and which are slidingly inserted into an appropriate annular recess 579 surrounding the nozzle 575. The limit stop for the snap-brackets 578 is defined by the flange 557 of the nozzle 575.

Advantageously, the toroidal cartridge ejector 569 comprises an inner concentric sidewall 568 that is sized so as to define an annular gap between the tip end 558 of the injection nozzle, which gap is completely filled with the sidewall of the lid port 86b when the cartridge 81 is mounted into the extraction assembly. Therefore, in the particular arrangement depicted in FIG. 28, the cartridge ejector acts also as a retaining wall against a possible expansion of the lid port during the extraction phase.

The extraction assembly of FIG. 28 benefits of a simple arrangement that eliminates piercing needles and, at the same time, guarantees a contamination-free coupling between the cartridge, the extraction chamber and the water injection chamber. In fact, regardless of whether the lid port is closed or not before installing it into the extraction assembly, the injection nozzle acts as a male part and the lid port as a female part, and the injection nozzle can pierce the upper seal, if any, of the lid port without the need of an appropriate needle.

The injection portion 575, 585 of the extraction assembly is kept insulated from the extraction chamber defined by the cartridge by means of an external O-ring, and a very high number of consecutive extraction processes of the same or different beverages can be carried out without cleaning or servicing in any way the extraction assembly.

Moreover, the external O-ring 566 of the injection nozzle can be easily replaced or serviced without having to access internal parts of the injection nozzle itself.

It has thus been shown that the present invention fulfils the proposed aim and objects. Clearly, several modifications to either the cartridges and the extraction assemblies according to the invention will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The disclosures in European Patent Applications 04007293.6-04007294.4-04007295.1-04007296.9 from which this application claims priority are incorporated herein by reference.

What is claimed is:

1. A cartridge, particularly for espresso coffee machines, for extracting a beverage from a particulate substance contained therein by means of water under pressure, the cartridge comprising:
    a main body comprising a cup portion and a lid portion, the cup portion comprising a base, a sidewall and a rim opposed to said base, the lid portion being fixedly attached to said rim of the cup portion so as to define an internal volume of said cartridge, the internal volume of said cartridge housing the particulate substance comprised within filtering means for retaining said particulate substance and for percolating fluid substances therethrough, said lid portion comprising a normally closed lid port defining a first passage for percolation fluid substances when it is opened, further comprising a tappet arranged inside said internal volume so as to pierce said base when a pressure is applied externally to said base towards said internal volume, thus opening a normally closed cup port of said base.

2. The cartridge according to claim 1, wherein the base of said cup portion forms a substantially conical hollow volume with said particulate substance and said filtering means, said conical hollow volume housing said tappet that holds on said normally closed cup port.

3. The cartridge according to claim 1, wherein said tappet comprises a disc-like supporting portion on which said particulate substance and said filtering means lean and a spike protruding out from the supporting portion on its side opposite to said particulate substance and said filtering means, so that said tappet holds on said cup port when it is closed and said spike pierces said cup port when said pressure is applied.

4. The cartridge according to claim 3, wherein the bottom side of said tappet comprises radial ribs protruding towards the base of said cup portion, for keeping a gap between said base and said tappet should said base buckle due to said pressure.

5. The cartridge according to claim 1, wherein said main body has a substantially cylindrical shape with a conically protruding base.

6. The cartridge according to claim 1, wherein it is made of any material selected from the following: thermoplastics, aluminum, rubber, polylaminate plastics, thermosetting compositions, and any combination thereof.

7. The cartridge according to claim 1, wherein said particulate substance is selected from the group comprising: ground coffee, roasted ground coffee, instant coffee, tea, powdered chocolate, powdered milk, instant based brews or soups.

8. An extraction assembly to be mounted on beverage extraction machines, comprising a support connectable to a water outlet of a beverage extraction machine and a cartridge holder securable to said support, said cartridge holder holding a cartridge according to claim 1.

9. The extraction assembly of claim 8, wherein said cartridge holder has an internal shape substantially corresponding to the external shape of said cartridge so that said cartridge can tightly fit within said holder.

10. A cartridge, particularly for espresso coffee machines, for extracting a beverage from a particulate substance contained therein by means of water under pressure, the cartridge comprising:

a main body comprising a cup portion and a lid portion, the cup portion comprising a base, a sidewall and a rim opposed to said base, the lid portion being fixedly attached to said rim of the cup portion so as to define an internal volume of said cartridge, the internal volume of said cartridge housing the particulate substance comprised within filtering means for retaining said particulate substance and for percolating fluid substances therethrough, said lid portion comprising a normally closed lid port defining a first passage for percolation fluid substances when it is opened, further comprising a tappet arranged inside said internal volume so as to pierce said base when a pressure is applied to said base towards said internal volume, thus opening a normally closed cup port;

wherein said tappet comprises a disc-like supporting portion on which said particulate substance and said filtering means lean and a spike protruding out from the supporting portion on its side opposite to said particulate substance and said filtering means, so that said tappet holds on said cup port when it is closed and said spike pierces said cup port when said pressure is applied; and wherein said supporting portion comprises a plurality of through holes evenly distributed on its top surface.

11. An extraction assembly to be mounted on beverage extraction machines, characterized in that it comprises:

a support connectable to a water outlet of a beverage extraction machine; and a bayonet cartridge holder securable to said support; and a cartridge for extracting a beverage from a particulate substance, said cartridge being held inside said bayonet cartridge holder;

said cartridge comprising:

a main body comprising a cup portion and a lid portion, the cup portion comprising a base, a sidewall and a rim opposed to said base, the lid portion being fixedly attached to said rim of the cup portion so as to define an internal volume of said cartridge, the internal volume of said cartridge housing the particulate substance comprised within filtering means for retaining said particulate substance and for percolating fluid substances therethrough, said lid portion comprising a normally closed lid port defining a first passage for percolation fluid substances when it is opened, a tappet being arranged inside said internal volume so as to pierce said base when a pressure is applied externally to said base towards said internal volume, thus opening a normally closed cup port of said base, said bayonet cartridge holder being internally shaped so as to apply said external pressure to the base of said cartridge towards said internal volume when the bayonet cartridge holder is secured by rotation thereof to said support.

* * * * *